(12) United States Patent
Teramachi

(10) Patent No.: US 6,231,238 B1
(45) Date of Patent: *May 15, 2001

(54) LINEAR MOVEMENT GUIDE APPARATUS AND METHOD FOR ASSEMBLING THE APPARATUS

(75) Inventor: Hiroshi Teramachi, Tokyo (JP)

(73) Assignee: THK Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/338,523

(22) PCT Filed: Mar. 30, 1994

(86) PCT No.: PCT/JP94/00526

§ 371 Date: Nov. 29, 1994

§ 102(e) Date: Nov. 29, 1994

(87) PCT Pub. No.: WO94/23219

PCT Pub. Date: Oct. 13, 1994

(30) Foreign Application Priority Data

Mar. 30, 1993 (JP) .................................. 5-095349
Jul. 6, 1993 (JP) .................................. 5-192075

(51) Int. Cl.$^7$ ........................................ F16C 29/06
(52) U.S. Cl. ................................ 384/45; 29/898.03
(58) Field of Search ................. 384/45, 43, 44; 464/168; 29/898.03

(56) References Cited

U.S. PATENT DOCUMENTS

| | | |
|---|---|---|
| 4,582,369 | 4/1986 | Itoh . |
| 4,692,038 | 9/1987 | Kasai ........................ 384/45 |
| 5,273,365 | * 12/1993 | Kondoh .................. 385/45 |
| 5,492,412 | * 2/1996 | Tsukada ................ 384/45 |

FOREIGN PATENT DOCUMENTS

| | | |
|---|---|---|
| 40 41 421 A1 | 7/1991 | (DE) . |
| 0 577 963 A1 | 1/1994 | (EP) . |
| 57-33217 | 2/1982 | (JP) . |
| 59-54814 | 3/1984 | (JP) . |
| 60-155012 | 8/1985 | (JP) . |
| 62-141308 | 6/1987 | (JP) . |
| 63-24258 | 7/1988 | (JP) . |
| 64-53621 | 4/1989 | (JP) . |
| 64-53622 | 4/1989 | (JP) . |
| 3-199710 | 8/1991 | (JP) . |
| 4-102714 | * 4/1992 | (JP) . |
| WO 84/01194 | 3/1984 | (WO) . |

OTHER PUBLICATIONS

Blurb translation above ref. 4–102714 (1992).*
"THK LM System" catalog, Published Jan. 1997, p. 1.

* cited by examiner

Primary Examiner—Lenard A. Footland
Assistant Examiner—C Williams
(74) Attorney, Agent, or Firm—Armstrong, Westerman, Hattori, McLeland & Naughton

(57) ABSTRACT

The linear movement guide apparatus according to the invention has features that two rows of ball rolling grooves are formed on an upper surface of a tracking base and one or two rows of ball rolling grooves are formed on both side surfaces thereof, respectively, on a concave portion of a sliding base are provided corresponding ball rolling grooves so as to face to the ball rolling grooves formed on the tracking base; the depth of each ball rolling groove about ½ of the diameter of balls to be held therein; and the distance between the ball rolling grooves formed on the upper surface of the tracking base and the distance between said ball rolling grooves and the ball rolling grooves formed on side surfaces are varied with respect to the distances between the corresponding ball rolling grooves formed on the sliding base. Thereby, the pitches between the ball rolling grooves on the tracking and sliding bases can be selected so as to obtain an optimum contact angles of balls for the load condition applied to the linear movement guide apparatus.

3 Claims, 14 Drawing Sheets

FIG. 11(a)
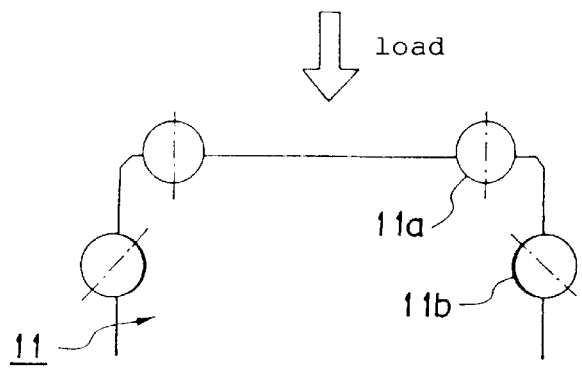
FIG. 11(b)
FIG. 12(a)
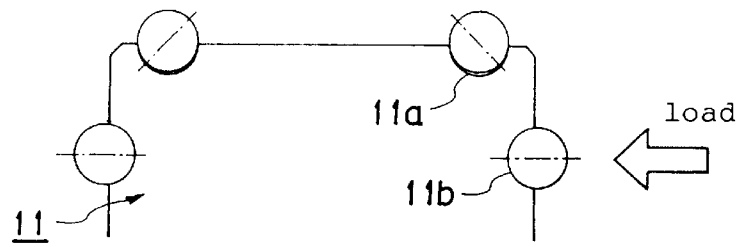
FIG. 12(b)
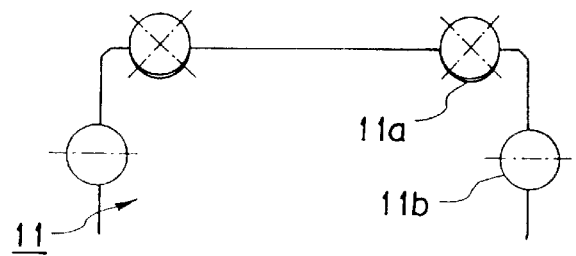

FIG.21
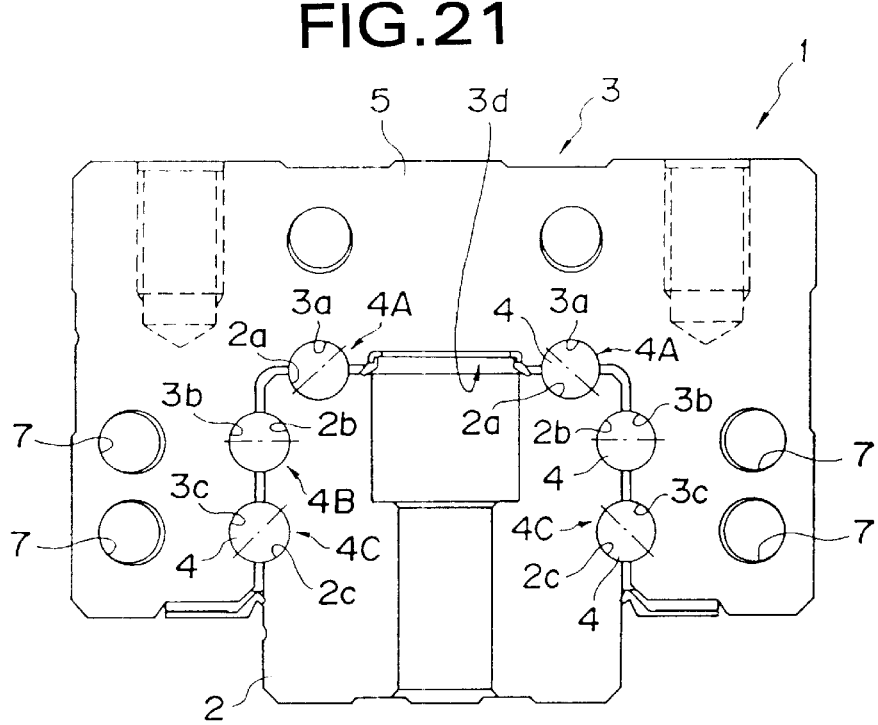
FIG.22(a)
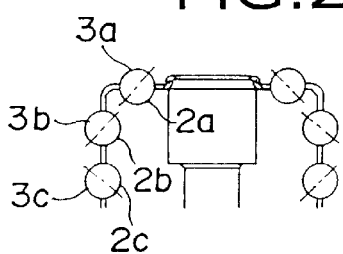
FIG.22(b)
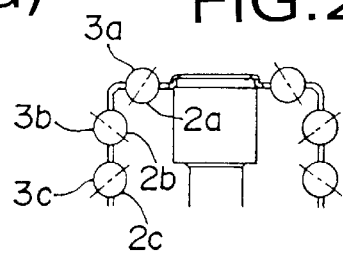
FIG.22(c)
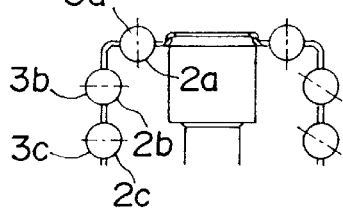
FIG.22(d)
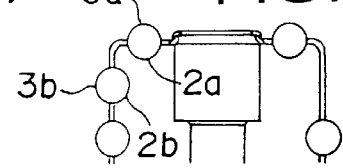
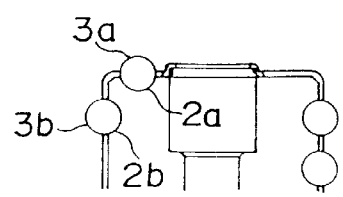
FIG.22(e)

LINEAR MOVEMENT GUIDE APPARATUS AND METHOD FOR ASSEMBLING THE APPARATUS

TECHNICAL FIELD

The present invention relates to a linear movement guide apparatus, which is used to be applied to linear guide portions of, for instance, machine tools or robots for use in industrial purpose.

In such machine tools or robots, all kinds of load, i.e. load from a radial direction, load from a horizontal direction, load from a reversed-radial direction, and a moment load, are applied to the linear guide portion thereof, since the linear guide portion of the tools or robots is diversified. The present invention, particularly, relates to a linear movement guide apparatus and a method for assembling the apparatus, in which a common member is used to manufacture a tracking base and a sliding base of the apparatus without regard to the amount or the direction of load applied thereto, and suitable contact angles according to the directions, to which the loads are applied, can be obtained to give a maximum life time, a maximum stiffness and a maximum allowance of load to the apparatus.

BACKGROUND ART

First Prior Art

Such kind of linear movement guide apparatus is, for instance, disclosed in Japanese Utility Model Preliminarily Publication No. Hei 3-199710.

FIG. 23 is a schematic view showing an apparatus of the first prior art.

As shown in FIG. 23, the linear movement guide apparatus 30 comprises a tracking base 31 having a square-shape cross-section, a sliding base 32 having a concave portion 32, which also has a square-shaped cross section, for accepting said tracking base 31, and four rows of indefinitely circulating balls 33. On an upper surface of the tracking base 31 are provided two rows of ball rolling grooves 31a, and on each side surface of the tracking base 31 is arranged one row of ball rolling groove 31b, respectively. On an inside surface of said concave portion 32c of said sliding base 32, are provided two rows of corresponding ball rolling grooves 32a so as to face to said two rows of ball rolling grooves 31a formed on the upper surface of the tracking base 31, and one row of corresponding ball rolling groove 32b formed on each side surface thereof so as to face to the row of ball rolling groove 31b formed on the upper surface of the tracking base 31, respectively. The ball rolling grooves 31a and 32a, which face to each other, are arranged as circular-ark shaped shallow grooves having a slightly larger dimension than that of the balls to be held therein. It should be noted that the ball rolling grooves 31a and 31b, which also face to each other, are arranged as Gothic ark-shaped grooves.

Holders 34 and 35 are provided in the apparatus in order to prevent that balls 33 are fallen down from the grooves when the sliding base 31 is taken off from the tracking base 32.

Contact angles of balls, in the linear movement guide apparatus 30, are arranged such that the contact angles in the upper two ball rows are substantially directed in a vertical direction, but in the lower two ball rows, the balls are made contact with the ball rolling grooves, which have their shapes of a combination of two circular-arks, at four points, i.e. at perspective upper points and perspective lower points, in a substantially even manner (hereinafter, such contact condition is called "complete four points contact"). In such a manner, above, in the linear movement guide apparatus 30, the load applied from an upper direction is supported by the two rows of ball rolling grooves 31a and 32a having circular-ark shapes; and the load applied from a horizontal direction is supported by the ball rolling grooves 31b and 32b having Gothic-ark shapes by the complete four points contact.

Therefore, the apparatus has an excellent load supporting capability against the loads applied from not only an upper direction but also a lateral direction.

Second Prior Art

On the other hand, another linear movement guide apparatus 40 is disclosed in Japanese Utility Model Publication no. Sho 63-24258.

As shown in FIG. 24, the linear movement guide apparatus 40 comprises a tracking base 41 having a square-shaped cross section, a sliding base 42 having a concave portion 42c, which also has a square-shaped cross section, for accepting the tracking base 41, and four rows of infinite circulating balls 43.

On side surfaces of the tracking base 41 are provided two rows of ball rolling grooves 41a, respectively; and on an inside surface of the concave portion 42c of the sliding base 42 are provided corresponding two rows of ball rolling grooves 42a so as to face to the ball rolling grooves 41a of the tracking base 42. Therefore, four rows in total are formed in the apparatus. These ball rolling grooves 41a and 42a, which face to each other, are designed as Gothic-ark shaped grooves, and the contact angle of balls in each ball row is arranged about 45 degrees with respect to a horizontal direction.

In the linear movement guide apparatus 40, it is possible to have different constructions that the extended lines of the contact angles on the side surfaces of the tracking base 41 intersect with each other outside of the tracking base 41 (hereinafter, called as "DB structure"), or that the extended lines intersect with each other inside of the tracking base 41 (hereinafter, called as "DF structure"), by making a distance A between two rows of ball rolling grooves 41a and 41a, which are formed on the side surfaces of the tracking base 41, larger or smaller than a distance B between the corresponding two rows of ball rolling grooves 42a and 42a, which are formed on the inside surface of the sliding base 42.

In any way, in the linear movement guide apparatus 40, when a small load is applied thereto from a vertical direction, the load is supported by one of the ball rows formed on the side surfaces, i.e. two ball rows in total; and when a large load is applied thereto from the vertical direction, the load is supported by two ball rows formed on the side surfaces, i.e. four ball rows in total. Since the number of ball rows for supporting the load is increased when a heavy load is applied, as stated in the above, a burden for the load in each ball rolling groove is reduced, so that the life time of the linear movement guide apparatus 40 becomes long.

Third Prior Art

Another linear movement guide apparatus, in which six ball rows in total are provided, is disclosed in, for instance, Japanese Patent Application Preliminarily Publication No.

Sho 62-141308. In this apparatus, two ball rows are formed on an upper surface side of a tracking base, and two ball rows are on the right and left side surfaces thereof, respectively.

As shown in FIG. 25, the linear movement guide apparatus 100 comprises a tracking base 101, a sliding base 102 having a concave portion 102d for accepting the tracking base 101 which is linearly guided along the tracking base 101, and six rows of indefinite circulated balls 103 which are provided between the sliding base 102 and the tracking base 101 in a rotatable manner.

On an upper surface of the tracking base 101, are provided a couple of ball rolling grooves 101a, and on each side surface thereof, are formed a couple of ball rolling grooves 101b and 101c, respectively. On the other hand, on an upper surface and each side surface of the concave portion 102d of the sliding base 102, are formed corresponding ball rolling grooves 102a, 102b and 102c, facing to the ball rolling grooves 101a, 101b and 101c formed on the surface of the tracking base 101, respectively.

In addition thereto, holders 107 and 108 are provided in the two ball rows 104 formed on the upper surface of the tracking base and in the two ball rows 105 and 106 formed on each side surface of the tracking base, respectively, in order to prevent that the balls 103 are fallen down when the sliding base 102 is taken off from the tracking base 101.

In the linear movement guide apparatus 100, the contact angles of balls in the ball rows 104 are arranged such that the contact angle a, which is defined as an angle formed by a contact line of the ball 103 held in the ball rolling groove 101a of the tracking base 101 with respect to a horizontal direction, is set at 90 degrees. And the contact angles are arranged in two ball rows 105, 106 formed on each side surface of the tracking base such that a contact angle β, which is defined as an angle formed by contact lines of ball 103 in the upper and lower ball rolling grooves 101b and 101c with respect to the horizontal direction, is set at 45 degrees, which are inclined in upper and lower directions inside of the tracking base 101, respectively. And thus, intersection points of these contact lines are located outside of the tracking base 101.

In the thus constructed linear movement guide apparatus 100, the vertical load applied from an upper direction against the sliding base 102 is supported by four ball rows in total, i.e. two ball rows 104 formed on the upper surface thereof and two ball rows 106 provided in the lower portion of side surfaces thereof.

Further, the lateral load applied from left and right directions is supported by either of upper two ball rows 105 or lower two ball rows 106 in accordance with the load applied direction. Furthermore, the load applied from a lower direction is supported by the upper two ball rows 105 formed on the side surfaces.

Fourth Prior Art

In Japanese Patent Preliminarily Publication No. Sho 64-53621, another linear movement guide apparatus 200 having six ball rows is further disclosed.

As shown in FIG. 26, the linear movement guide apparatus 200 comprises a tracking base 201, a sliding base 202 having a concave portion 202d, along which said tracking base 201 is guided, for accepting said tracking base 201, and six indefinite circulated ball rows 203, which are extended between the sliding base 202 and the tracking base 201 in a rotatable manner.

On each side surface of the tracking base 201, are formed three rows of ball rolling grooves 201a, 201b and 201c; and on each inner side surface of the concave portion 202d of the sliding base 202 are provided corresponding three rows of ball rolling grooves 202a, 202b and 202c so as to face to the three rows of ball rolling grooves 201a, 201b and 201c of the tracking base 201.

A holder 207 is provided in each ball row 204, 205 and 206 formed on each side surface in order to prevent that the balls are fallen down when the sliding base 202 is taken from the tracking base 201.

The contact angles of the balls 203 in the linear movement guide apparatus 200 are arranged such that the contact angles of the balls in the upper and middle rows are inclined in a lower direction toward inside of the tracking base 201 by about 45 degrees; and the contact angles of the balls in the lower rows are inclined in an upper direction toward inside of the tracking base 201 by about 45 degrees, so that the intersecting points 01 and 02 of the contact lines L1, L2 and L3 of the contact angles in upper, middle and lower rows are located inside of the tracking base 201.

In the thus constructed linear movement guide apparatus 200, since the contact lines L1 and L2 of the balls 203 in the upper and middle ball rows 204 and 205 are extended in a lower inside direction of the tracking base 201, the radial load applied from the upper direction against the sliding base 202 is supported by the upper and middle ball rows 204 and 205, and the reversed-radial load applied in the floating direction is supported by the lower ball rows 206. Therefore, in this apparatus the stiffness for the radial load is much higher than that for the reversed-radial load. It is now defined that the stiffness means a performance that the bases are not apt to be deformed by the load effected between the sliding base and the tracking base, and are not apt to be unsteady. In the case of the fourth prior art, the apparatus is so designed as to make the stiffness for the load F applied in the radial direction large, to increase the capability to support a heavy load.

Fifth Prior Art

Furthermore, in Japanese Patent Preliminarily Publication No. Sho 64-53622, there is disclosed another linear movement guide apparatus 200', which is modified from the above-mentioned linear movement guide apparatus 200 in such a manner that the ball 203 in the middle ball rows 205 are arranged to be contact with the grooves at four points and the contact lines L21 and L22 are extended to lower inside and upper inside directions by about 45 degrees and intersect to each other at a portion inside of the tracking base 201, as shown in FIG. 27.

In the thus constructed linear movement guide apparatus 200', the radial load F is supported by the upper ball rows 204 and the reversed-radial load f is by the lower ball rows 206.

On the other hand, the balls in the middle row of 205 are arranged to be made contact with the grooves at four points to support both the radial load and the reversed-radial load.

In the above-explained first to five conventional linear movement guide apparatuses, various performances are required to support the loads applied from all directions. That is to say, it is required to have a load supporting capability broken up with various ratios against the loads applied from upper, lower, left side and right side directions, in order to decrease vibration of machine, to which the apparatus is applied, by causing a differential sliding on the balls when a predetermined load or more is applied, or to roll the balls in a light manner in order to drive the apparatus in a high speed.

However, the conventional linear movement guide apparatuses mentioned in the above are designed to comply with only one of the requirements in such type of linear movement guide apparatuses, therefore the apparatuses can not satisfy all of the requirements mentioned in the above.

In the conventional apparatuses, the shapes of the tacking and sliding bases, the number of ball rows, and the contact angles are selected in accordance with the purpose of use of the apparatus, and the linear movement guide apparatuses are designed so as to obtain the performance to be required, manufactured in accordance with the design, and then supplied. The manufacturers accede to the various requirements of the users by manufacturing a large number of types of the linear movement guide apparatuses. However, it causes a lack of mass productivity and a low producing effect.

The present invention has been invented, taking the task of the prior arts into consideration; and has for its purpose to provide a linear movement guide apparatus having a suitable performance for supporting the load applied from each direction and a method for assembling the apparatus, in which pitches between the ball rolling grooves formed on the tracking base and the sliding base are changed in accordance with the load condition applied thereto in order to obtain ball rolling grooves having optimum contact angles.

DISCLOSURE OF INVENTION

A linear movement guide apparatus according to the present invention comprises a tracking base, a sliding base having a concave portion for accepting said tracking base and being linearly guided along said tracking base, and balls being held between said sliding base and said tracking base in a rotatable manner; said tracking base comprises at least one row of ball rolling groove on an upper surface thereof and at least one row of ball rolling groove on each side surface thereof; and said sliding base comprises corresponding ball rolling grooves, formed on upper and both side surfaces of said concave portion of the sliding base so as to face to the ball rolling grooves formed on said upper and side surfaces of said tracking base;

said apparatus is characterized in that a positional relationship of centers of the ball rolling grooves formed on the upper and side surfaces of either one of the tracking base or the sliding base are arranged to be coincident with or deviated from the corresponding ball rolling grooves formed on the corresponding tracking or sliding base, and the tracking base or the sliding base, in which said positional relationship of the centers of the grooves is coincident with or deviated from the corresponding ball rolling grooves, is mounted on the corresponding tracking base or the corresponding sliding base with an arbitrary combination.

The apparatus is characterized in that two rows of ball rolling grooves are provided on the upper surface of the tracking base and one row of ball rolling groove is provided on each of the left and right side surfaces of the tracking base, respectively.

The apparatus is further characterized in that a pair of rows of ball rolling grooves are provided on the upper surface of the tracking base and a pair of rows of ball rolling grooves are provided on the left and right side surfaces of the tracking base, respectively.

The apparatus is further characterized in that the tracking base has a square-shaped cross section, and a positional relationship of the centers of the ball rolling grooves formed on the tracking base and the sliding base is identified with each other or deviated from each other by changing a distance between the two rows of the ball rolling grooves formed on the upper surface of the tracking base and a distance between the ball rolling grooves formed on the upper surface and the ball rolling grooves formed on the side surfaces thereof with respect to the corresponding distances between the corresponding ball rolling grooves formed on the sliding base.

The apparatus is characterized in that the ball rolling grooves are arranged to have their depths by which the contact angles of balls to be held therein can be freely selected.

The apparatus is characterized in that the depths of the ball rolling grooves are arranged to be substantially ¼–½ of a diameter of ball to be held therein.

The apparatus is characterized in that the ball rolling grooves formed on the upper surface of the tracking base and the ball rolling grooves formed on the sliding base, which face to the grooves formed on the tracking base, have circular-ark shapes which are slightly larger than the ball to be mounted therein; and the ball rolling grooves formed on the side surfaces of the tracking base and the corresponding ball rolling grooves formed on the sliding base have their shapes that two circular-arks are combined.

The apparatus is characterized in that the ball rolling grooves formed on the upper surface of the tracking base and the corresponding ball rolling grooves formed on the sliding base facing thereto and the ball rolling grooves formed on side surfaces of the tracking base and the corresponding ball rolling grooves formed on the sliding base facing thereto have circular-ark shapes which are slightly larger than the balls to be mounted therein.

The apparatus is further characterized in that the ball rolling grooves formed on the upper surface of the tracking base and the corresponding ball rolling groove formed on the sliding base facing thereto, and the ball rolling grooves formed on side surfaces formed on the tracking base and the corresponding ball rolling grooves formed on the sliding base facing thereto have their shapes that two circular-arks are combined.

The apparatus is further characterized in that the ball rolling grooves formed on the upper surface of the tracking base and the corresponding ball rolling grooves formed on the sliding base to be facing thereto have their shapes that two circular arks are combined; but the ball rolling grooves formed on side surfaces of the tracking base and the corresponding ball rolling grooves formed on the sliding base facing thereto have circular-ark shapes which are slightly larger than the balls to be mounted therein.

The apparatus is further characterized in that the contact angles of the balls mounted in two rows of ball rolling grooves, which constitute a pair of rows mutually corresponding to each other, formed on the tracking an sliding bases are arranged to be 90 degrees with respect to a horizontal direction; and the contact angles of the balls mounted in two rows of ball rolling grooves, which constitute a pair of rows mutually corresponding to each other, formed on each surface side of the tracking and sliding bases are arranged to be about 45 degrees being inclined in an upper and inside direction of the tracking base with respect to a horizontal direction.

The apparatus is further characterized in that the contact angles of the balls mounted in two rows of ball rolling grooves, which constitute a pair of rows mutually corresponding to each other, formed on each side surface of the tracking and sliding bases are arranged to be substantially zero degrees with respect to a horizontal direction; and the contact angles of the balls mounted in two rows of the ball rolling grooves, which constitute a pair of rows mutually corresponding to each other, formed on the upper surfaces of the tracking and sliding bases, are arranged to be substantially 90 degrees with respect to a horizontal direction.

The apparatus is further characterized in that all of the ball rolling grooves formed on the tracking and sliding bases have their shapes of single circular-ark, which are slightly larger than the balls to be mounted therein, and at least one of the grooves has its cross section whose radius of curvature is set to be smaller than 0.52 of the diameter of the balls to be mounted in the groove.

The apparatus is further characterized in that said ball rolling grooves have their cross sections whose radius of curvature are set at about 0.51 of the diameter of the balls to be mounted in the grooves.

The method for assembling the linear movement guide apparatus according to the present invention is characterized in that the method comprises the following steps:

a step for forming a first member having first ball rolling groove(s) on an upper surface thereof and second ball rolling groove(s) on left and right side surfaces thereof;

a step for forming a plurality types of second members, which are arranged to be assembled to said first member in a slidable manner via a given number of ball rows, each member comprising third ball rolling groove(s), which are arranged such that a positional relationship of centers of the third ball rolling groove(s) is coincident with or deviated from the first ball rolling groove(s) formed on the first member, and fourth ball rolling groove(s), which are arranged such that a positional relationship of centers of the fourth ball rolling groove(s) is coincident with or deviated from the second ball rolling groove(s) formed on the first member; and a step for selecting a combination of the first and second members so as to obtain suitable contact angles for supporting loads applied from each direction and a moment load.

The assembling method is further characterized in that the method comprises the following steps:

a step for forming a first member comprising a pair of first ball rolling grooves which are separated from each other in a width direction thereof by a first pitch, and a pair of second ball rolling grooves, which are separated from said first ball rolling grooves in a height direction thereof by a second pitch;

a step for forming a plurality types of second members, which are arranged to be assembled to the first member in a slidable manner via four ball rows, comprising a pair of third ball rolling grooves, which are separated from each other in a width direction thereof by a third pitch, which is different from the first pitch, and a pair of fourth ball rolling grooves, which are separated from the third ball rolling grooves in a height direction by a fourth pitch, which is different from said second pitch; and a step for selecting a combination of said first and third pitches and said second and fourth pitches so as to obtain suitable contact angles for loads applied from each direction and a moment load.

The assembling method is further characterized in that depths of the ball rolling grooves are arranged such that the contact angles of the balls to be held therein can be freely selected.

The assembling method is further characterized in that the depths of the ball rolling grooves are arranged to be substantially ¼ to ½ of the diameter of balls to be mounted therein.

In the linear movement guide apparatus according to the present invention, it may be possible to arrange the ball rolling grooves so as to have circular-ark shapes which are slightly larger than the balls to be mounted therein, or Gothic-ark shapes; but the depths of the grooves should be in a range from about a quarter of the diameter of balls, which is suitable for the case that an angle deviation of the contact angles is small, to about a half of the diameter of the ball, which is suitable for the case that an angle deviation of the contact angles is large. Therefore, in the apparatus the balls are surely made contact with the circular ark-shaped ball rolling grooves at any portion, and thus it substantially allows to obtain all of the contact angles, which have been demanded in such type of conventional linear movement guide apparatuses.

The contact angle in each ball rolling groove can be set in an arbitrary manner by changing the pitch (distance) between the two rows of ball rolling grooves formed on the upper surface of the tracking base, and the pitch (distance) between said ball rolling grooves formed on the upper surface of the tracking base and the ball rolling grooves formed on side surfaces of the tracking base with respect to the pitch (distance) between the corresponding ball rolling grooves formed on the sliding base.

Particularly, in case that the ball rolling grooves are arranged to have circular-ark shapes which are slightly larger than the balls to be mounted therein, the contact angles are not limited to 45 degrees with respect to a horizontal direction but it is substantially possible to obtain the contact angles in an arbitrary manner.

Further, in case that the ball rolling grooves have their shapes of the combination of two circular-arks, it is possible to arrange such that the balls are made contact with the ball rolling grooves at two points, in order to cause a differential sliding for the first time that much more load beyond over the desired load is applied, or from the first.

There are provided balls between the ball rolling grooves formed on the upper and side surfaces of the tracking base and the corresponding ball rolling grooves formed on the sliding base. Therefore, it is possible to increase the stiffness of the linear movement guide apparatus by providing balls having dimensions slightly larger than the spaces between the ball rolling grooves to give a pre-load.

Further, since there are provided two rows of deep ball rolling grooves on the upper surface of the concave portion of the sliding base, it is possible to make the thickness of the upper portion of the sliding base large so that the stiffness of the block of the sliding base is increased.

Furthermore, since one row of the ball rolling groove is formed on each inside surface of the concave portion of the sliding base, it is possible to make the length of the side portion of the sliding base short to increase the stiffness of the linear movement guide apparatus. Therefore, the total height of the block of the sliding base becomes low and the height of the tracking base also becomes low because the position of the ball rows on the side surfaces thereof can be located in an upper portion. Therefore, the height of the linear movement guide apparatus as a whole becomes low and the size thereof compact.

Particularly, even in either cases that the grooves are designed as Gothic-ark style or as Circular ark style, a damping effect is improved by designing the depths of the grooves to be about 51% of the diameter of the balls to be held therein. Because, when the load, which is applied to the apparatus when the heavy machining is conducted, is applied, an amount of differential sliding is increased and thus the ball moves in the grooves in a mixed manner of the rolling movement and the sliding movement, causing that the rolling movement becomes like the sliding movement, and thus the damping effect (damping characteristic) is increased. Therefore, when the linear movement guide apparatus is used in machinery tools, it is possible to make the amount of slight waviness at machine as much as possible, and then the working accuracy is improved. Particularly, it is effective to set the contact angles of balls in the ball rotating grooves formed on the upper surfaces, at 90 degrees, which is an angle that the load is applied when the heavy cutting machining is conducted.

When the depths of the ball rolling grooves are set at 51% of the diameter of the balls to be held therein, the contact area of balls with respect to the general type of circular-ark shaped grooves becomes larger (the contact are becomes like that of the roller), so that the loading capacity for supporting a heavy load is rapidly increased in cooperation with the construction of said contacting angles, and a high stiffness and a stable linear movement can be obtained.

When the heavy machining is conducted, the apparatus works in a low speed. Therefore, even if some sliding is caused, the life time of the apparatus is not affected so much. Further, since the differential sliding is increased in proportion with the load to be applied, an extremely reasonable contact structure can be obtained.

BRIEF DESCRIPTION OF DRAWINGS

FIGS. 1 to 13 are schematic views showing embodiments of the linear movement guide apparatus according to the present invention, in which four ball rows are provided; and FIG. 1 is a perspective view having partially broken portion illustrating one of the embodiments of the apparatus.

FIG. 2 is a cross sectional view of FIG. 1 cut in a width direction

FIG. 3 is a schematic view for explaining a locational relationship of the ball rolling grooves in the linear movement guide apparatus shown in FIG. 1.

FIG. 4 is a schematic view depicting one example of a machinery tool to which the linear movement guide apparatus according to the invention is applied.

FIG. 5 is schematic view illustrating directions of each load applied to the linear movement guide apparatus.

FIG. 6 is a schematic view for explaining a function in the linear movement guide apparatus according to the first embodiment of the present invention.

FIG. 7 is a schematic view for explaining a function in the linear movement guide apparatus according to the second embodiment of the present invention.

FIG. 8 is a schematic view for explaining a function in the linear movement guide apparatus according to the third embodiment of the present invention.

FIG. 9 is a schematic view for explaining a function in the linear movement guide apparatus according to the fourth embodiment of the present invention.

FIG. 10 is a schematic view for explaining a function in the linear movement guide apparatus according to the fifth embodiment of the present invention.

FIG. 11 is a schematic view for explaining a function in the linear movement guide apparatus according to the sixth embodiment of the present invention.

FIG. 12 is a schematic view for explaining a function in the linear movement guide apparatus according to the seventh embodiment of the present invention.

FIG. 13 is a schematic view for explaining a function in the linear movement guide apparatus according to the eighth embodiment of the present invention.

FIGS. 17 to 21 are schematic views showing the linear movement guide apparatuses according to the invention which have six ball rows, and FIG. 17 is a schematic view for explaining the ninth embodiment according to the invention.

FIG. 18 is a perspective view with partially broken portion illustrating a basic structure of the linear movement guide apparatus having six ball rows, shown in FIG. 17.

FIG. 19 is a schematic view for explaining a function in the linear movement guide apparatus according to the tenth embodiment of the present invention.

FIG. 20 is a schematic view for explaining a function in the linear movement guide apparatus according to the eleventh embodiment of the present invention.

FIG. 21 is a schematic view for explaining a function in the linear movement guide apparatus according to the twelfth embodiment of the present invention.

FIGS. 22(*a*) to (*c*) are schematic views showing each of other contact angle structures in the linear movement guide apparatus having six ball rows; and FIGS. 22(*d*) and (*e*) are schematic views representing the linear movement guide apparatuses having other arrangements of ball rows.

BEST MODE FOR CARRYING OUT THE INVENTION

The detail of the linear movement guide apparatus according to the present invention will be explained in the following with reference to the drawings.

Figure 1:
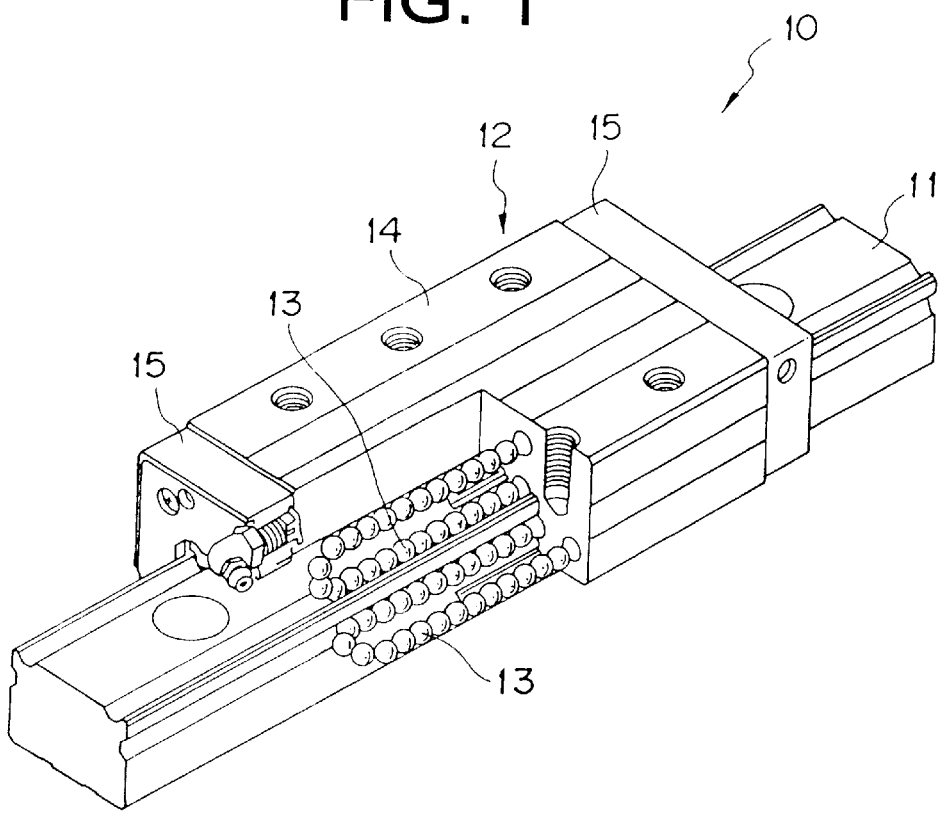
Figure 2:
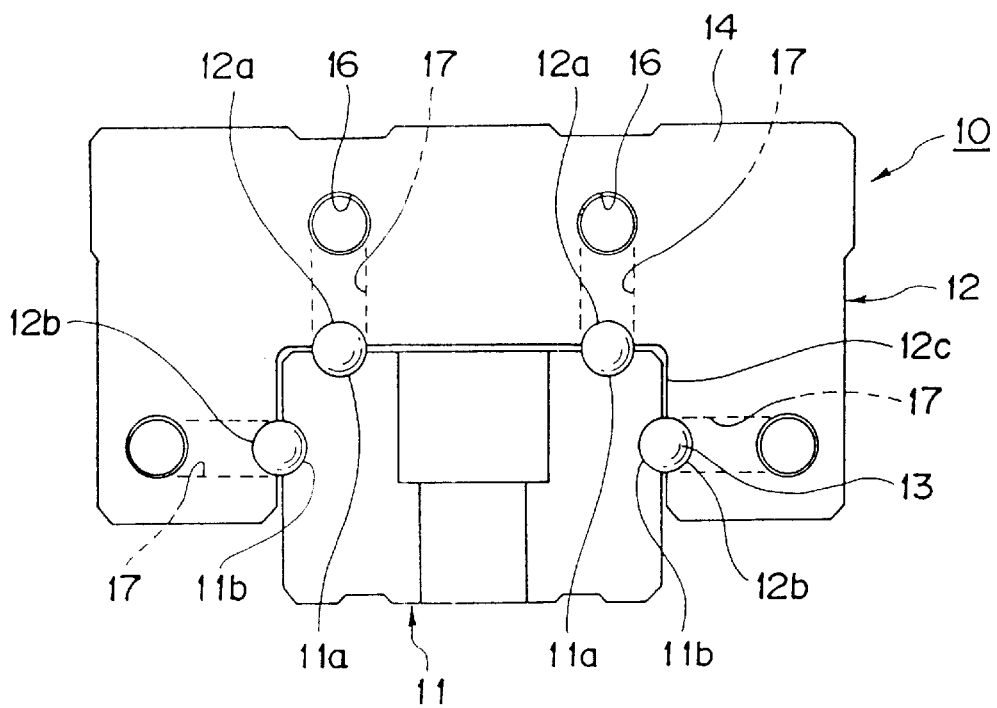

FIGS. 1 and 2 are cross-sectional views, which are cut in a width direction, of one of the embodiments of the linear movement guide apparatus according to the invention.

The linear movement guide apparatus 10 according to the invention comprises a tracking base 11 having a square-shaped cross section, a sliding base 12 having a concave portion 12*c* for accepting said tracking base 11 and four ball rows 13 existing between the tracking base 11 and the sliding base 12 in a rotatable manner, as a summary.

The sliding base 12 comprises a sliding base block 14 having a high stiffness and side caps 15 which are fixed to both edge surfaces of said sliding base block 14.

On an upper surface of the tracking base 11, are provided two rows of ball rolling grooves 11*a* and on each side surface thereof is formed one row of ball rolling groove 11*b*, respectively. On the other hand, on an inner surface of the concave portion 12*c* of the sliding base block 14 are formed corresponding ball rolling grooves 12*a* and 12*b*, respectively, so as to face to the rolling grooves 11*a* and 11*b*, and in the sliding base block 12 are formed ball relief bores 16. In the side caps 15 are formed direction converting paths 17, respectively, which connect the both ends of the ball paths formed between the ball rolling grooves 11*a*, 12*a* and 11*b*, 12*b* located in the load applied area and both ends of the ball relief bores 16.

It should be noted that no retainer for preventing that the balls are fallen down when the sliding base 12 is taken off from the tracking base 11 is provided in the apparatus of the embodiment, due to the small space.

Figure 14:
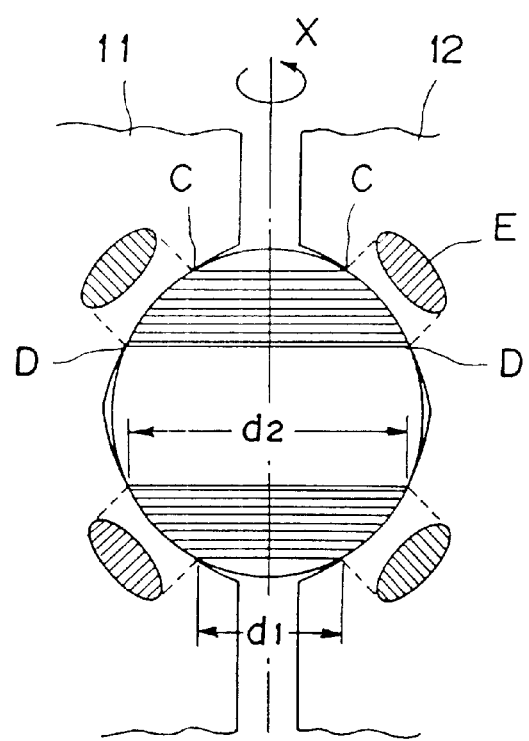
FIG. 14 is a schematic view for explaining a condition of the differential sliding caused in the apparatus having Gothic ark type grooves.
Figure 15:
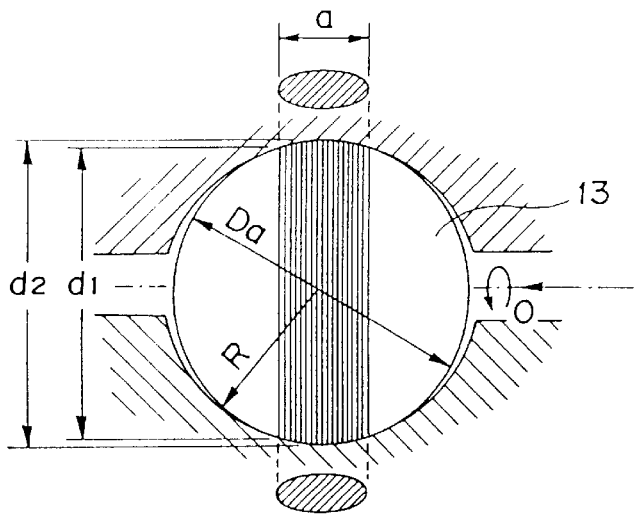
FIG. 15 is a schematic view for explaining a condition of the differential sliding caused in the apparatus having a circular ark type grooves.

The ball rolling grooves 11a, 12a and 11b, 12b, which face to each other, may have so-called circular-ark type cross sections, consisting of a single circular-ark, as shown in FIG. 15, or so-called Gothic ark type, consisting of a combination of two circular-arks, as shown in FIG. 14; but the depths of the ball rolling grooves are set in such a manner that contacting angles of balls can be freely selected. In this embodiment, the depths of the ball rolling grooves are set at substantially half of the diameter of balls to be held therein. Thereby, the balls 13 should be made contact with any portion of the substantial semi-circular shaped ball rolling grooves 11a, 12a and 11b, 12b, respectively. Therefore, in the apparatus, almost all of the contact angles, which have been demanded in the conventional type of such linear movement guide apparatuses, can be obtained.

Particularly, when the circular-ark shaped ball rolling grooves are slightly larger than the balls to be held therein, the contact angles are not limited to 45 degrees with respect to a horizontal direction, but arbitrary angles can be obtained, substantially. When the variation of the contact angles is small, it is not necessary to make the depth of the ball rolling grooves about half of the diameter of the balls to be held therein. In such case, it may be possible to arrange the depths of the grooves to be about a quarter of the diameter of balls to be held therein.

Figure 23:
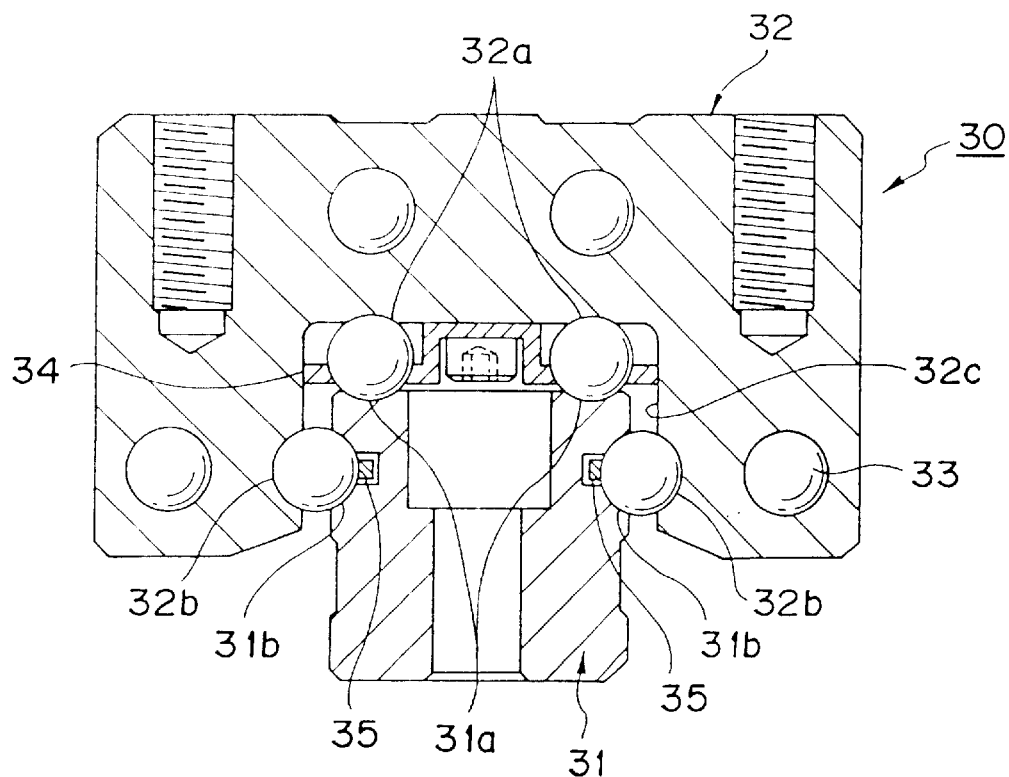
FIGS. 23 to 27 are cross-sectional views cut in a width direction, illustrating constructions of the conventional linear movement guide apparatuses.

Contrary to this, in the conventional linear movement guide apparatus 30 shown in FIG. 23, the depths of the rolling grooves 31a and 32a, which are formed on the upper surface side of the sliding base and on the inner side of the concave portion of the corresponding tracking base, are arranged to be small and the circular-ark shapes of the grooves are designed to be slightly larger than the balls to be held therein. The apparatus 30 is not originally designed to have other contact angles excepting for the contact angle formed in a vertical direction. However, even if the contact angles extended in other directions than the vertical direction can be objected, the balls would be made contact with the ball rolling grooves at points located in the vicinity of edges of the ball rolling grooves. Therefore, the contact stress on the edge portions of the grooves would become extremely large, so that there would be a fear that ball rolling surfaces are destroyed.

Figure 3:
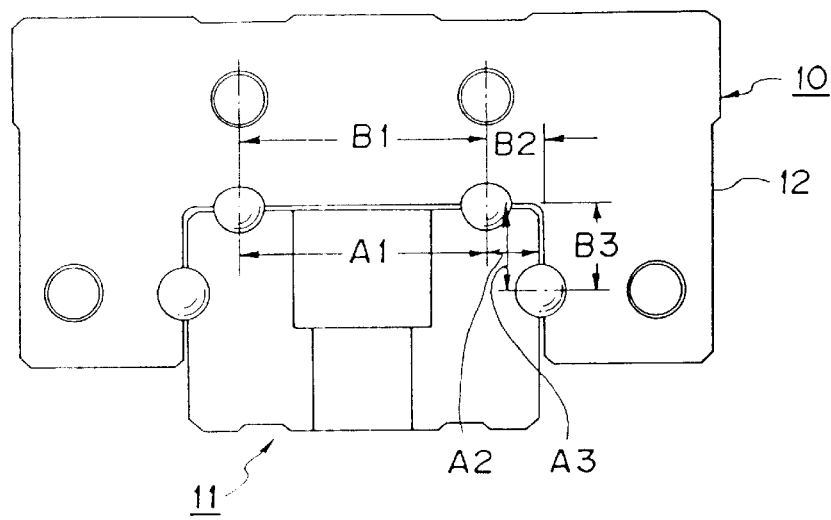

According to the invention, it is possible to provide a linear movement guide apparatus as shown in FIG. 3 having various contact angles, shown in FIGS. 6 to 13, by variably changing the pitch (distance) B1 between the two rows of ball rolling grooves formed on the upper surface of the tracking base 11, and the pitch (distance) B2+B3 between said rows of the ball rolling grooves and the ball rolling grooves formed on the side surface of the tracking base, with respect to the pitches (distances) A1, A2, A3 between the corresponding ball rolling grooves formed on the sliding base. Such apparatuses have a suitable performance to support the load applied from each direction. It should be noted that only the tracking base, the balls and the contact angles are illustrated in a typical manner in FIGS. 6 to 13 in order to make the drawings much more understandable. The extending directions of the contact angles are shown by dotted broken lines in these figures. The lines connect the contact portions of balls in the ball rolling grooves facing to each other. Hereinafter, the lines will be called as contact angle lines.

Figure 5:
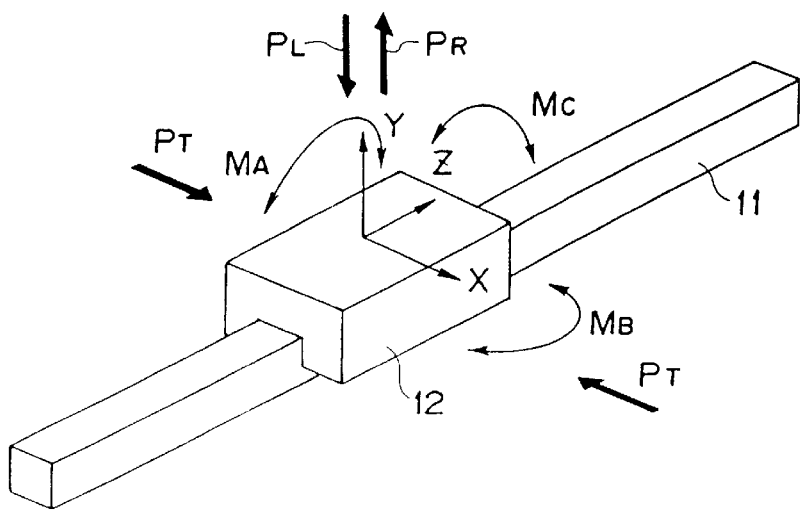

All of the embodiments shown in the figures are basically designed so as to be able to support the loads applied from all directions being perpendicular to an axial direction of the tracking base 11, which are represented by the loads applied from the four directions shown in FIG. 5, i.e. a radial load PR applied from a direction, in which the sliding base 12 is urged against the tracking base 11 from an upper direction, a reversed radial load PL applied to a direction, in which the sliding base 12 is urged to be risen up against the tracking base 11, and lateral loads PT applied to the sliding base 12 from left and right directions. Further, the apparatuses are designed so as to be basically able to support the moment Mc about the axial direction Z of the tracking base 11, the moment Mb about a perpendicular axis Y, and the movement MA about a horizontal axis X. The apparatus is designed such that the stiffness in each direction is relatively varied in accordance to the specific load apply direction by selecting the proper contact angles of ball.

Figure 24:
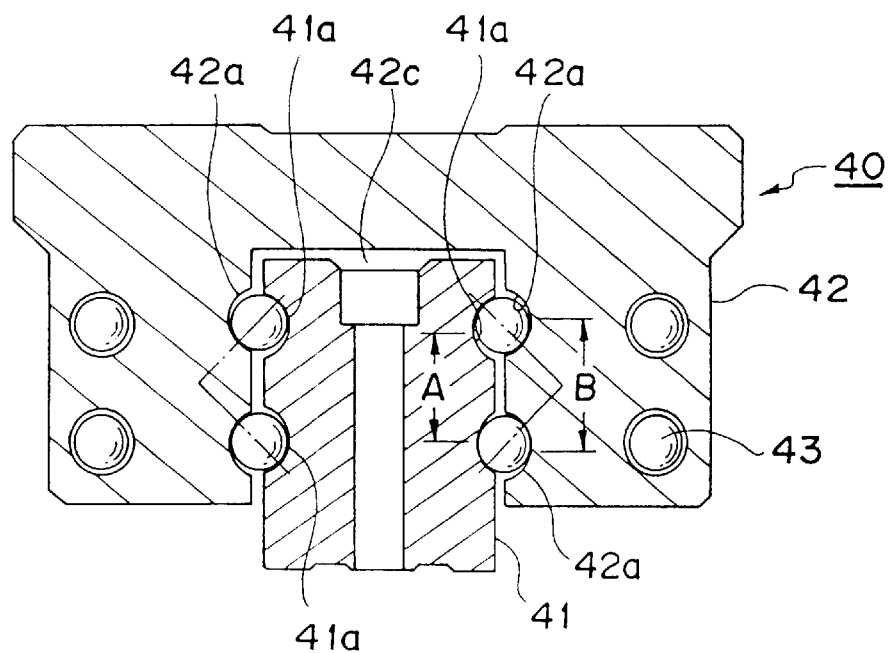
Figure 25:
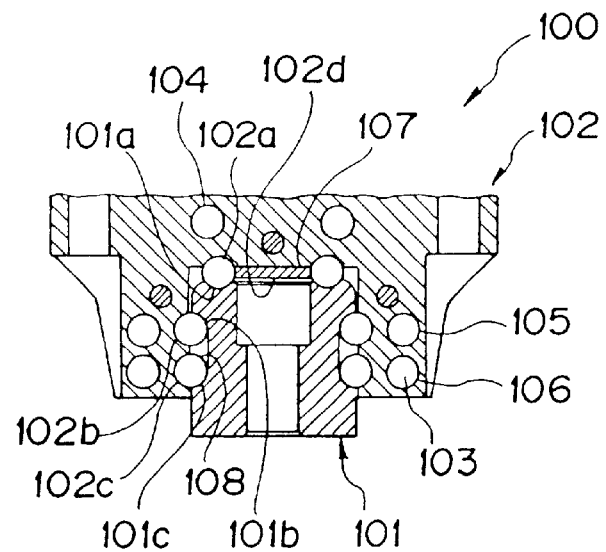
Figure 26:
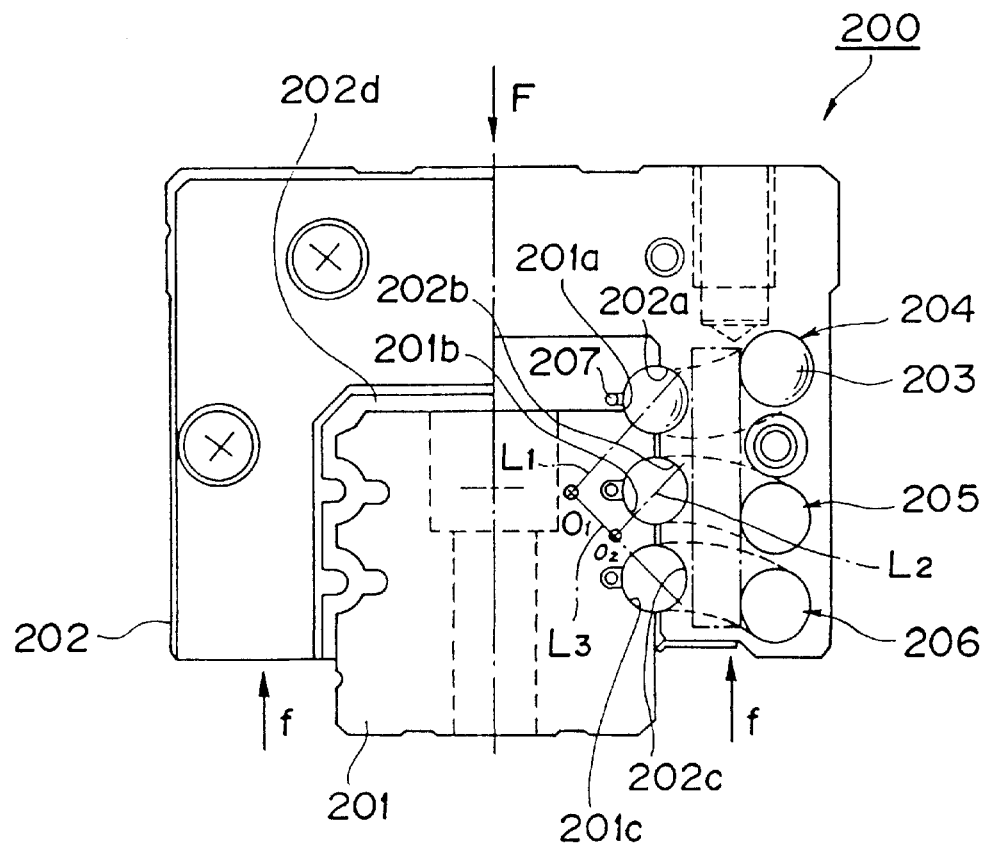
Figure 27:
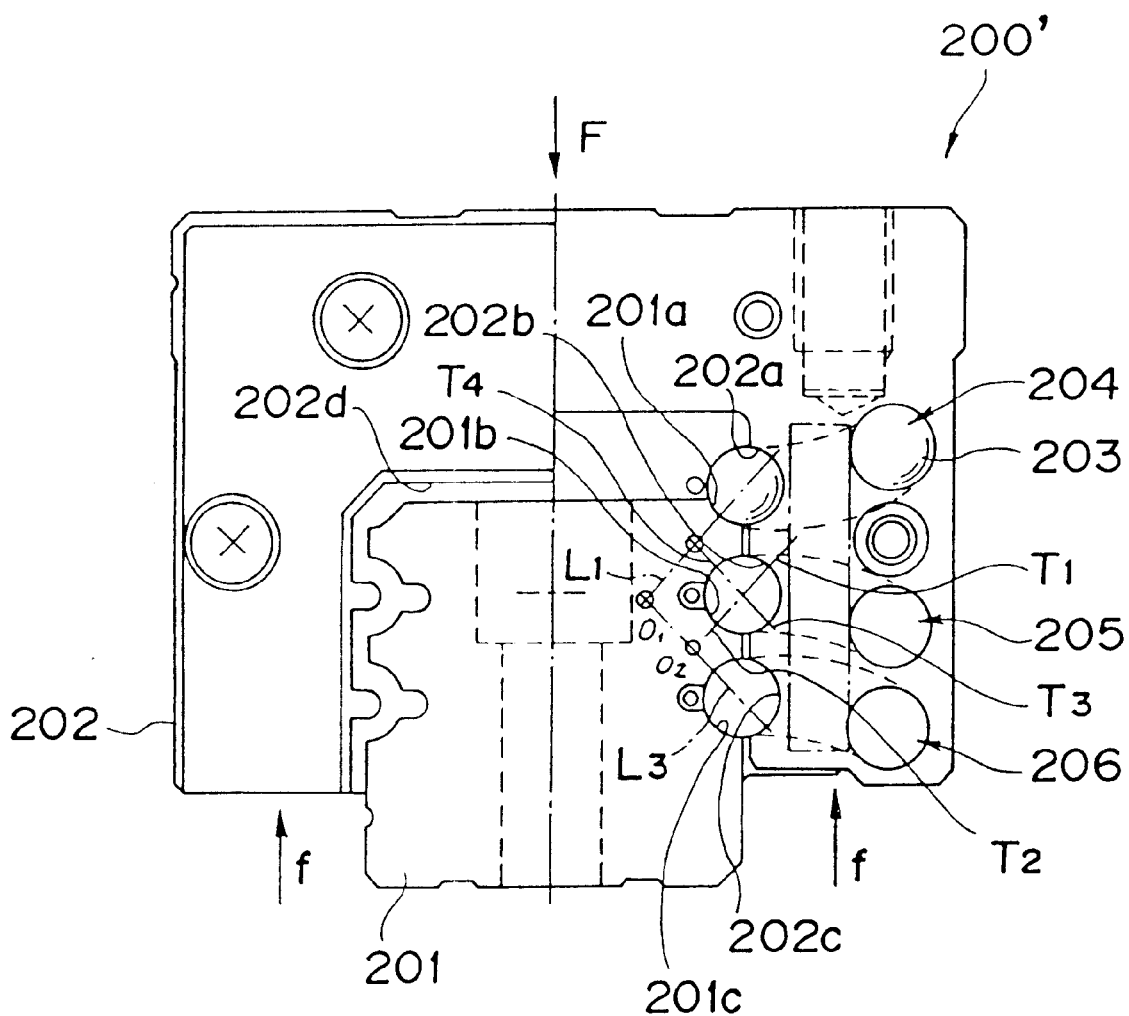

In the conventional linear movement guide apparatus 40 shown in FIG. 24, the contact structure is also varied to be DB structure or to be DF structure by changing the distance A so as to become larger or smaller than the distance B. However, in this apparatus 40, the contact angles per se are not varied, but keeping them about 45 degrees. Therefore, the conventional linear movement guide apparatus 40 does not have a performance for supporting the load applied from each direction, e.g. to change the load supporting capability in a width direction with respect to that in an upper and lower direction in an arbitrary manner.

Figure 6:
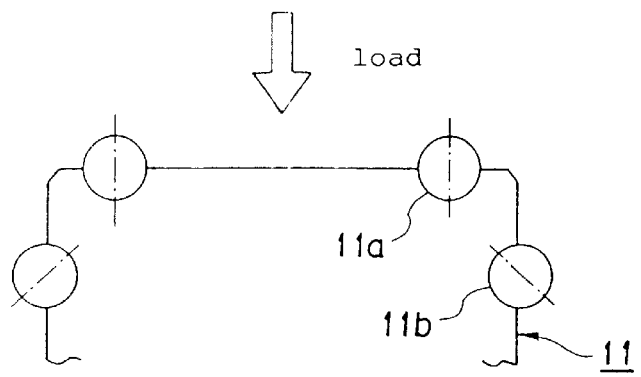

In FIG. 6, the linear movement guide apparatus according to the first embodiment of the present invention is illustrated.

In the first embodiment, the two rows of ball rolling grooves 11a formed on the upper surface of the tacking base 11 and the corresponding ball rolling grooves 12a formed on the sliding base 12 so as to face thereto, and one row of ball rolling grooves 11b formed on each side surface of the tracking base 11 and the corresponding ball rolling groove 12b on the sliding base 12 facing thereto, are designed to have circular-ark shapes consisting of a single circular-ark; and their depths are arranged to be substantially half of the diameter of balls to be held therein.

The contact angle lines in the upper ball rows are extended in a substantially vertical direction and the contact angle lines in the lower ball rows are inclined by 45 degrees with respect to the horizontal direction; and the contact angles lines of the lower ball rows intersect to each other at a point located on an upper side of the lower ball rows.

This type of the linear movement guide apparatus has a large load supporting capability for the main load, i.e. the load applied from an upper direction (radial load), and the apparatus is designed such that a large differential sliding is not caused so much. Therefore, this type of apparatus is suitably used when the apparatus is driven in a high speed. That is to say, in this apparatus, the radius of curvature of the cross-sections of the ball rolling grooves 11a and 12a; 11b and 12b are set at about 0.52 of the diameter of the balls to be held therein, which is a range for restricting the generation of the differential sliding small.

Further, when the radius of curvature of the ball rolling grooves having circular-ark shapes are arranged to be as almost the same size of the diameter of balls to be held therein, it becomes possible to obtain linear movement guide apparatuses having a various types of contact angles, in which the contact angles are varied only by slightly changing the pitches (distances) A1–A3 and B1–B3 between the ball rolling groove explained in the above.

It should be noted that the word of "differential sliding" means a sliding caused on the contact surface of balls held and rotated in the grooves. The sliding is caused by a difference between the inner contact diameter and the outer contact diameter of the circular-shaped contact surface of balls. The difference is generated when the balls are rolled because the balls are made contact with the ball rolling grooves in a circular-ark shaped condition. In the case of the ball rolling grooves having Gothic-ark type shapes, which are consisting of a combination of two circular-arks, the balls are made contact with the grooves at four points, as shown in FIG. 14. When the balls are rolled in the grooves, being made contact with the grooves at four points, the difference between the inner contact diameter d1 and the outer contact diameter d2 becomes large; and further when the balls are rolled about the axis X, the difference between the inner contact point C and the outer contact point D becomes large, so that a large sliding is generated between the outer surface of the balls and the ball rolling grooves. Thereby, the balls are rolled in the grooves being slid, so that the rolling resistance, which is generated when the balls are rolled in the grooves, is increased. Therefore, when the sliding base 12 is moved along the tracking base 11, a large friction resistance is generated. It should be noted that the reference symbol E in FIG. 14 represents an area where the balls and the rolling grooves are contacted to each other.

In case that the ball rolling grooves have circular-ark type shapes, which consist of only a single ark, the balls made contact with the grooves at tow points as shown in FIG. 15. In this case, the contact width a is smaller in comparison with that of the Gothic-ark type ball rolling grooves. Therefore, it can be generally be said that only a small differential sliding is caused and thus the balls are rolled in the grooves in a preferred manner in the apparatus.

In FIG. 7, there is depicted the linear movement guide apparatus according to the second embodiment of the present invention.

In the second embodiment, the two rows of ball rolling grooves 11a formed on the upper surface of the tracking base 11 and the corresponding ball rolling grooves 12a formed on the sliding base 12 facing thereto, and ball rolling grooves 11b formed on the side surfaces of the tracking base 11 and the corresponding ball rolling grooves 12b formed on the sliding base 12 facing thereto, are also designed as circular-ark type grooves having their depths of almost half of the diameter of balls to be held therein.

The contact angle lines in the upper ball rows are directed to a vertical direction and the contact angle lines in the lower ball rows are substantially extended into a horizontal direction.

The linear movement guide apparatus has a large load supporting capability for the main load, which is applied from the lateral directions; and is so designed that a differential sliding is not caused so much. Therefore, the apparatus is also suitably used when the apparatus is driven in a high speed.

Figure 7A:
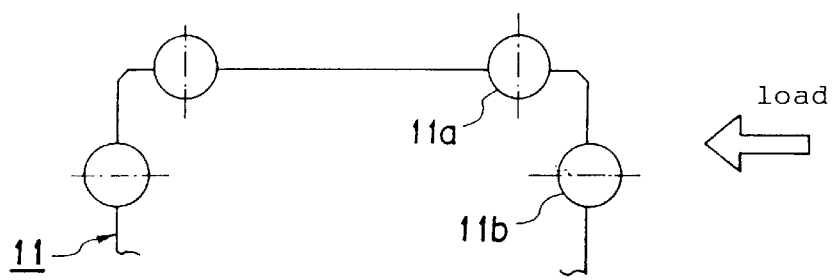
Figure 7B:
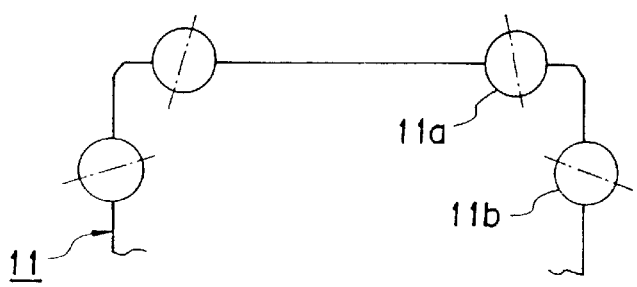

When the tracking base and the sliding base are coupled so as to have the contact angles as shown in FIG. 7(a), and a pre-load is given to the balls held in the ball rolling grooves, the contact angles of the balls are changed, and the contact angle lines are inclined as shown in FIG. 7(b). Since the pre-load is applied to the balls with respect to a rotating direction of balls in the case that the sliding base is viewed from its axis direction, a linear movement guide apparatus having a high stiffness and no space in the rotating direction of balls can be obtained.

Figure 8A:
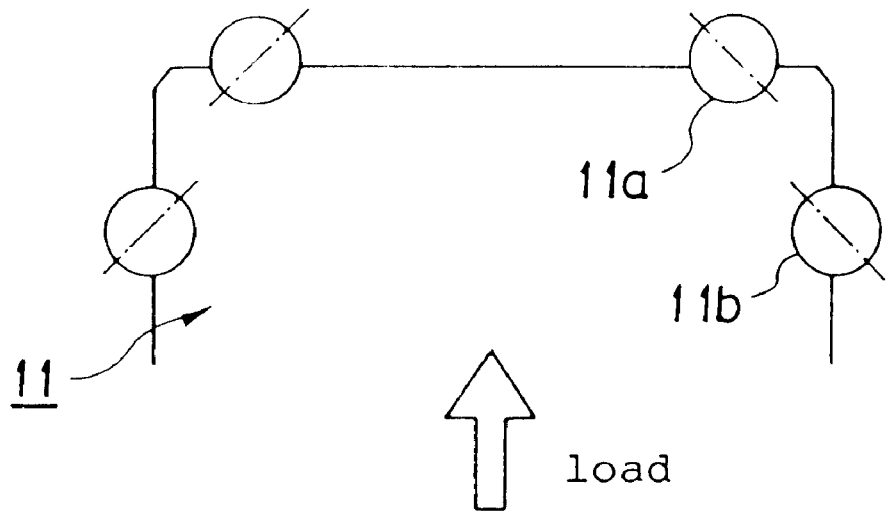
Figure 8B:
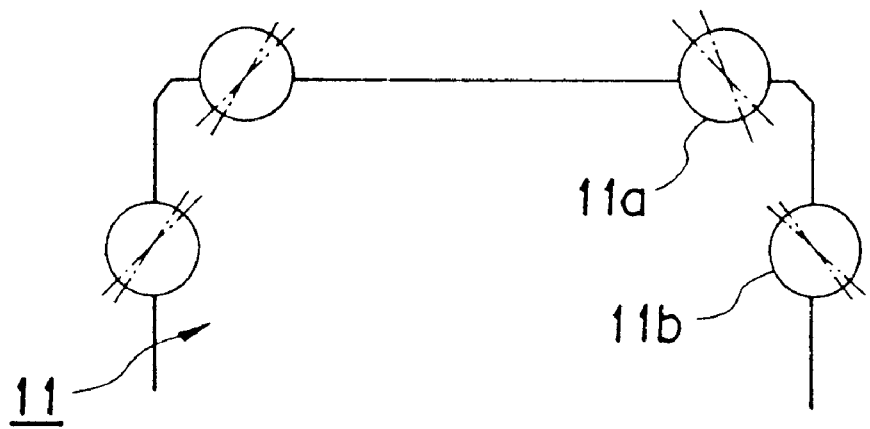

In FIG. 8, a linear movement guide apparatus according to the third embodiment of the present invention is represented.

In the third embodiment, two rows of the ball rolling grooves 11a formed on the upper surface of the tracking base 11 and the corresponding ball rolling grooves formed on the sliding base 12 so as to face thereto, and the rows of the ball rolling grooves 11b formed on both the side surfaces of the tracking base 11 and the corresponding ball rolling grooves formed on the sliding base 12b facing thereto, are designed to have circular-ark shapes consisting of a single circular-ark, and to have depths of about half of the diameter of balls to be held therein.

In the apparatus shown in FIG. 8, the contact angle lines in the upper ball rows are inclined by about 45 degrees with respect to the horizontal direction, respectively and intersect to each other at an upper point of the upper ball rows. Further, the contact angle lines in the lower ball rows are extended in a direction parallel to the contact angle lines of the upper ball rows.

The linear movement guide apparatus has a capability to support a large load applied from a lower direction (reversed radial load), and is designed such that the differential sliding is not caused so much. Therefore, the apparatus is suitably used when the apparatus is driven in a high speed.

When the tracking base is coupled with the sliding base having contact angles as shown in FIG. 8(a) and a pre-load is given to the balls held between the ball rolling grooves, the contact angles are changed so that the angle formed by the contact angle lines in the grooves 11a and the angle formed by the contact angle lines in the grooves 11b and 11b become small. Since a pre-load is applied to the balls with respect to the rotating direction of balls when the sliding base is viewed from its axis direction, a linear movement guide apparatus having a high stiffness and no space in the ball rotating direction can be obtained. The pre-load can be applied to the balls by setting the distance between the ball rolling grooves, which are facing to each other, smaller than the diameter of the balls to be held therein. That is to say, when the pre-load is applied to the balls held in the grooves formed on the side surfaces of the bases, the tracking base is slightly deformed so as to be shrunk in a horizontal direction by a reaction force against the compression of the balls; but the sliding base is slightly deformed so as to be extended in a horizontal direction by the reaction force, so that the contact angles are changed.

Figure 9:
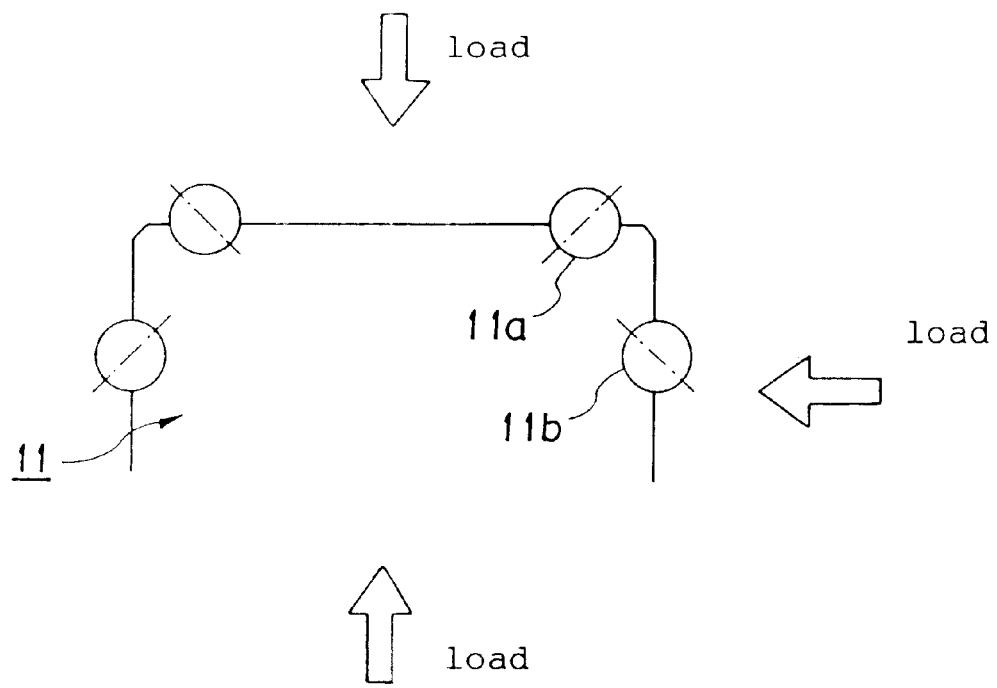

In FIG. 9, a linear movement guide apparatus according to the fourth embodiment of the present invention.

In the fourth embodiment, two rows of the ball rolling grooves 11a formed on the upper surface of the tracking base 11 and the corresponding ball rolling grooves 12a formed on the sliding base 12 so as to face thereto, and the rows of the ball rolling grooves 11b formed on the side surfaces of the tracking base 11 and the corresponding ball rolling grooves 12b formed on the sliding base 12 facing thereto, are designed to have circular-ark shapes consisting of a single circular-ark and to have their depths of half of the diameter of balls to be held therein.

In the fourth embodiment shown in FIG. 9, the contact angle lines in the upper ball rows are inclined in a lower and inside direction with respect to the horizontal direction and intersect to each other at a lower point of the upper ball rolling grooves; and the contact angle lines in the lower ball rows are inclined to an upper and inside direction with respect to the horizontal line and intersect to each other at an upper point of the lower ball rolling grooves.

In this linear movement guide apparatus has a capability to support loads applied from all directions, i.e. radial load PR, lateral load PT applied from a horizontal direction, and reversed radial load PL applied from a lower direction, and is designed such that the differential sliding is not generated so much. Therefore, the apparatus is suitably used to be driven in a high speed.

Figure 10:
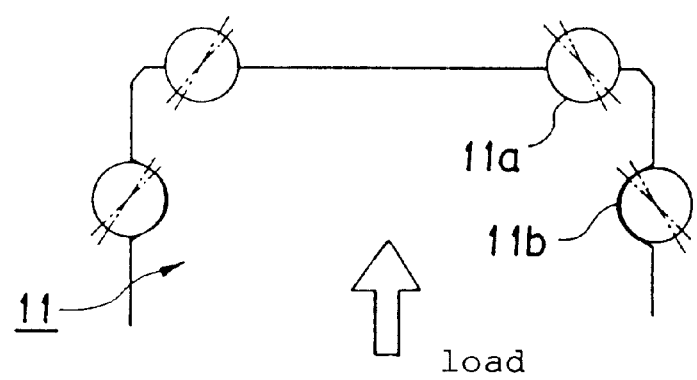

In FIG. 10, there is shown a linear movement guide apparatus according to the fifth embodiment of the present invention.

In the fifth embodiment, two rows of ball rolling grooves 11a formed on the upper surface of the tracking base 11, and the corresponding ball rolling grooves 12a formed on the sliding base 12 facing thereto are arranged to have their depths about half of the diameter of balls to be held therein; and these grooves are designed as circular-ark type grooves having single circular-ark shaped cross section. Further, the rows of ball rolling grooves 11b formed on side surfaces of the tracking base 11 and the corresponding ball rolling grooves 12b formed on the sliding base 12 facing thereto are arranged to have their shapes that two circular-arks are combined, and the depths thereof are about half of the diameter of balls to be held therein.

In fifth embodiment shown in FIG. 10, the contact angle lines in the upper ball rows are inclined by about 45 degrees with respect to the horizontal direction and the contact angle lines intersect to each other at an upper position of said ball rows. Further, the contact angle lines in the lower ball rows are also inclined to be substantially parallel to the lines in the upper ball rows, as like the embodiment shown in FIG. 8.

This type of the linear movement guide apparatus has a large load supporting ability against the main load applied from the lower direction (reversed radial load); and is designed such that so-called differential sliding is not caused so much. Therefore, the apparatus can be suitably used to be driven in a high speed.

FIG. 11 depicts a linear movement guide apparatus according to the sixth embodiment of the present invention.

In this embodiment, two rows of ball rolling grooves 11a formed on the upper surface of the tracking base 11 and the corresponding ball rolling grooves 12a formed on the sliding base 12 facing thereto are arranged to have circular-ark shapes having depths of about half of the diameter of balls to be held therein; and the rows of ball rolling groove 11b formed on both side surfaces of the tracking base 11 and the corresponding ball rolling grooves 12b formed on the sliding base 12 facing thereto are arranged as Gothic-arc type grooves having their depths of almost half of the diameter of balls to be held therein.

In the sixth embodiment shown in FIG. 10, the contact angle lines in the upper ball rows are directed in a substantially perpendicular direction and the contact angle lines in the lower ball rows are inclined by about 45 degrees with respect to the horizontal direction and then the lines intersect to each other in an upper position of the lower ball rows, as like as the embodiment shown in FIG. 6.

This type of linear movement guide apparatus has a large load supporting ability against the main load applied from the upper direction (radial load). When a large radial load is applied to such linear movement guide apparatus, the balls held in the lower grooves are made contact with the grooves at four points, as shown in FIG. 11(b).

Figure 4:
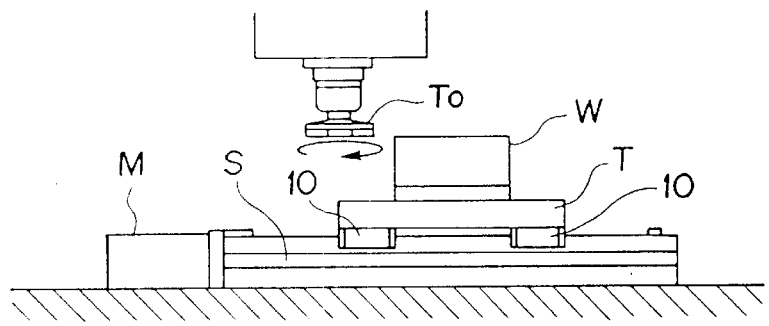

In this apparatus, so-called differential sliding is caused thereby to decrease a mechanical vibration, which is generated when the working object W of the machinery tool is cut by a cutting tool TO shown in FIG. 4. Therefore, the roughness of the cutting finish of the working object W and the accuracy of dimension thereof can be improved. Further, the thus caused differential sliding effects as a damper or a buffer means against a ball screw mechanism S. which is for driving the linear movement guide apparatus 10, and a driving source therefor, i.e. a motor M. In FIG. 4, an example is illustrated, in which the linear movement guide apparatus 10 according to the present invention is used in a movement guide section of a top table T for transporting the working object W.

In FIG. 12, a linear movement guide apparatus according to the seventh embodiment of present invention is illustrated.

In this embodiment, two rows of ball rolling grooves 11a formed on the upper surface of the tracking base 11 and the corresponding ball rolling grooves 12a formed on the sliding base 12 facing thereto are arranged as Gothic arc type grooves having depths almost half of the diameter of balls to be held therein, but the rows of ball rolling groove 11b formed on both side surfaces of the tracking base 11 and the corresponding ball rolling grooves 12b formed on the sliding base 12 so as to face thereto are arranged to have circular-ark shapes, whose depths are almost half of the diameter of balls to be held therein.

In the seventh embodiment shown in FIG. 12, the contact angle lines in the upper ball rows are inclined by about 45 degrees with respect to the horizontal direction and intersect to each other in an upper position of the upper ball rows; but the contact angle lines in the lower ball rows are directed in a substantially horizontal direction.

When a large load is applied to the linear movement guide apparatus from a horizontal direction, the balls held in one of the upper ball rows are made contact with the relevant groove at four points. Thereby, in this apparatus, so-called differential sliding is caused to decrease a mechanical vibration, which is generated when the working object of the machinery tool is subjected to be cut. Therefore, the roughness of cutting finish of the working object and the accuracy of dimension thereof can be improved. Further, the differential sliding effects as a damper or buffer means against a ball screw mechanism, which is for driving the linear movement guide apparatus 10 and a driving source therefor, i.e. a motor.

Figure 13:
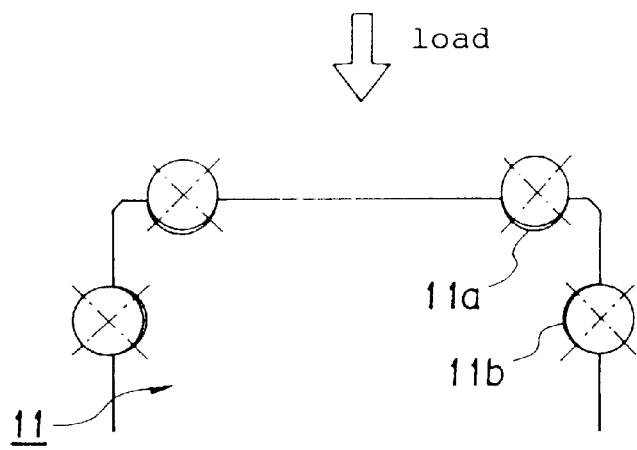

In FIG. 13, a linear movement guide apparatus according to the eighth embodiment of the present invention is represented.

In this embodiment, not only two rows of ball rolling grooves 11a formed on the upper surface of the tracking base 11 and the corresponding ball rolling grooves 12a formed on the sliding base 12 so as to face thereto but also the rows of ball rolling groove 11b formed on side surfaces of the tracking base 11 and the corresponding ball rolling grooves 12b on the sliding base 12 so as to face thereto are arranged as Gothic-arc type grooves having their depths of almost half or less of the diameter of balls to be held therein.

In the eighth embodiment shown in FIG. 13, the apparatus is designed such that the balls held in the ball rolling grooves 11a and 12a are made contact with the relevant ball rolling grooves formed on the tracking base 11 and 12 facing to each other at four points, when a large load is applied to the sliding base 12 from a lower direction.

Therefore, the apparatus is able to support a large load applied from the lower direction, and thus suitably used in a machinery, such as NC machinery or machining center, in which a comparatively heavy cutting process or a heavy grinding process is required.

In this apparatus, since the balls are made contact with the relevant ball rolling grooves formed in the tracking base 11 and the sliding base 12 at four points in a complete manner or at four points in an incomplete manner, in which the balls are made contact with the grooves with some deviation, an enough sliding resistance can be constantly obtained. The sliding resistance becomes larger, in response to the load applied from a lower direction. Therefore, the ball screw mechanism, for moving the sliding base 12 being applied a cutting load or a grinding lord, is not directly subjected to these loads. As a result, the apparatus has no drawback that the ball screw mechanism is damaged comparatively soon by a heavy cutting process or a heavy grinding process.

The sixth to eighth embodiments shown in FIGS. 11 and 13 in the above, the apparatuses are constructed such that the ball rolling grooves are designed as Gothic-arc type grooves consisting of a combination of two circular-arks and thus the balls are made contact with the relevant grooves at four points to obtain a differential friction when a heavy load is applied to the apparatus. However, even in case that the grooves are arranged as circular ark type grooves, consisting of a single circular-ark, it is possible to make the differential sliding large in order to increase the sliding resistance in the apparatus by the design that the radii of curvature of cross section of the grooves are close to the diameter of the balls to be held therein.

In this case, it is desired to set the radii of curvature R of the ball rolling grooves within a range smaller than about 0.52 of a diameter Da of ball to be held therein. However, if the radius of curvature is too small, a nimble rolling of balls, which is an inherent characteristic of such rolling guide apparatus, will be lost because the friction becomes too much large. Therefore, it is desired to set the radius of curvature in a range between 0.52 to 0.505, preferably at about 0.51.

In a rotary type ball and roller bearing, the radius of curvature of the cross section of the ball rolling groove is generally designed to be about 0.52 to 0.54 of a diameter of ball to be held therein, for the purpose of decreasing a rolling friction, which is caused on the rolling surface of the balls, particularly, for the purpose of preventing that a heat is generated when the balls are rolled in the grooves in a high speed. That is to say, when the radius of curvature of the ball rolling grooves becomes closer to 0.5 of the diameter of balls to be held therein, the contact width of the balls with respect to the ball rolling grooves becomes larger, so that a differential sliding between a center portion and the edge portions of the contact width becomes large. As a result, a friction resistance and the amount of heat generation also increase. Therefore, the radius of curvature of the groove is generally set at about 0.52 or more of the diameter of the ball to be held therein.

Further, in the case of a thrust ball bearing, the radii of curvature of cross sections of the ball rolling grooves formed on inner and outer races thereof are set at about 0.54 of the diameter of the balls to be held therein.

The basic idea of the linear rolling guide apparatus also exists on an extended line of this thinking. That is to say, the apparatus is generally designed in such a manner that the shapes of the cross sections of ball rolling grooves are arranged as so-called circular ark shaped grooves, which is consisting of a single circular-ark; and the radii of curvature of the cross sections thereof are generally set at about 0.52 to 0.54 of the diameter of balls to be held therein in order to restrain the increase of the friction resistance, as much as possible. In the above explained embodiments shown in FIGS. 3 to 11, the radii of curvature of the cross section of the grooves are set within this range.

By converting this idea, the same effect as that of the Gothic arch type grooves, which are shown in FIGS. 11 and 13, can be obtained. That is to say, the differential sliding caused in the ball rolling grooves having a cross section of a single circular-ark shapes is positively used to decrease the mechanical vibration, which is caused when the working object of the machinery tool is subjected to be cut.

That is to say, the cross sections of the grooves cut at a surface being perpendicular to an axis direction of the grooves have circular-ark shapes consisting of a single circular-ark, so that the all contact surfaces of the balls with respect to the ball rolling grooves become ellipse shaped circular ark surfaces whose longer axis is extended in a direction being perpendicular to the axis direction.

At each contact points along the longer axis of the ball contact surface, the distances from the rotating center axis of the balls are different from each other, and therefore, there are caused differential sliding on the ball contact surface. That is to say, when the balls are rotated, the balls are rolled and made contact with the grooves at some point on the longer axis of the ball contact surface without being slid, but at the other points, the balls are rolled and made contact with the grooves being slid. In the conventional apparatus, the differential sliding should be restricted as much as possible to decrease the friction. However, in the present invention, the differential sliding is used to control the friction caused in the axis direction, in order to obtain the stiffness and the damping, which are the characteristics required in the apparatus.

In other words, when the radius of curvature R of the ball rolling grooves is set at about 0.51 of the diameter D of the balls to be held therein, the differential sliding is increased therein by the load applied to the grooves when a heavy cutting is conducted; and thus the balls move in the grooves in a mixed condition of the rolling movement and the sliding movement. As a result, the rolling movement of the balls becomes like a sliding movement, so that the damping characteristic thereof is improved. Since the sliding and rolling phenomenon is generated between the balls and the ball rolling grooves and the movement of the balls becomes heavy, the damping characteristic is improved. Thus, it is possible to prevent that the amount of the slight waviness at machine is increased even when a heavy cutting is conducted.

Furthermore, in the apparatus having circular-ark type grooves, if the depths of the ball rolling grooves are set at 51% of the diameter of balls to be held therein, the contact area of balls becomes larger in comparison with the general circular ark type grooves. (In other words, the contact area becomes larger as like as that of rollers.) In this case, loading capability against a heavy load is rapidly improved, involving the construction of contact angles of balls explained in the above, and further a stable linear movement with a high stiffness can be obtained.

Next, a method for assembling linear movement guide apparatuses according to the first to eighth embodiment shown in FIGS. 6 to 13 will be explained in the above.

First, a common member is used to manufacture the tracking and sliding bases. These bases are manufactured by, for instance, a drawing method. On the other hand, dressers are prepared to form circular ark type grooves or Gothic-arc type grooves, whose depths are of about a quarter to a half of the diameter of balls to be held therein. It should be noted that pitches (distances) in width and height directions of each dresser are varied in accordance with the type of the contact angles of the linear movement guide apparatus.

That is to say, a pair of upper dressers, by which a predetermined-shaped grooves can be formed with a first pitch (distance) in its width direction, and a pair of lower dressers, by which a predetermined-shaped grooves can be formed to be separated from said upper dressers with a second pitch (distance) in a height direction, are used to manufacture the tracking base 11 from the common material having a square cross section. The thus manufactured tracking base 11 has a pair of ball rolling grooves 11a, 11a on an upper surface thereof, being separated from each other in its width direction by the first pitch (distance); and ball rolling grooves 11b on each side surface thereof being separated from said ball rolling grooves 11a by the second pitch (distance) in its height direction.

Next, a pair of upper dressers, by which a predetermined-shaped grooves can be formed being separated from each other by a third pitch (distance), which is different from said first pitch (distance), in its width direction, and a pair of lower dressers, by which a predetermined-shaped grooves can be formed being separated from said upper dressers in its height direction by a fourth pitch (distance), which is different from said second pitch (distance), are used to manufacture a plurality types of sliding bases 12 from the common member.

The thus manufactured sliding base 12 has a pair of ball rolling grooves 12a, 12a on an upper surface of a square shaped concave portion 12c, which are separated from each other by said third pitch (distance) in its width direction; and it also has ball rolling grooves 12b, which are separated from said ball rolling grooves 12a by said fourth pitch (distance) in its height direction on each side surface of said concave portion. It should be noted that these sliding bases are manufactured such that the third and fourth pitches (distances) are different from the first and second pitches formed on the tracking bases 11; and a plurality types of sliding bases 12 having different pitches of the ball rolling grooves are manufactured with respect to one standard tracking base 11 by varying the differences between said third and fourth pitches from the first and second pitches.

Then, a suitable combination of the first and third pitches (distances) and the second and fourth pitches (distances) is selected so as to obtain suitable contact angles for loads applied from each direction or moment loads; and then the linear movement guide apparatus having desired contact angles and desired groove shapes is assembled.

In the assembling method of the linear movement guide apparatus mentioned in the above, a plurality types of sliding bases 12 are manufactured on the basis of one tracking base 11. However, it may be possible to manufacture a plurality types of tracking bases 11 with respect to one basic sliding base 12. The positional relationship of the ball rolling grooves should be as in the following. That is to say, the positional relationship between the centers of the grooves formed on the upper surface of the tracking base and the centers of the grooves formed on the side surfaces of the tracking base, and the positional relationship between the centers of the grooves formed on the upper surface of the sliding base and the centers of the grooves formed on the side surfaces of the sliding base are arranged to be coincident with each other or deviated from each other between the grooves facing to each other. It may be possible to set the standard surface for processing on the other surface than the upper surface of the tracking base.

FIGS. 16(a) to (e), are illustrated the other types of constructions of the contact angles.

Figure 16A:
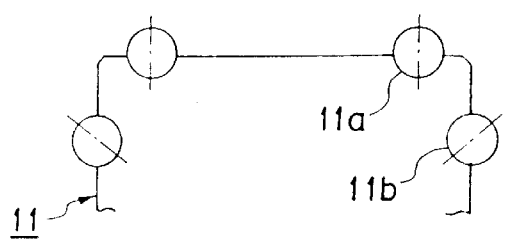
FIG. 16 is a schematic view showing the other examples of the contact angle structure in the linear movement guide apparatus having four ball rows.

FIG. 16(a) is one of the examples in which the contact angles of balls held in two rows of ball rolling grooves formed on the upper surface of the tracking base are set at about 90 degrees; and the contact angles of balls held in the rows of ball rolling grooves formed on the side surfaces of the tracking base are arranged such that the contact angle lines thereof are inclined in lower and inside direction with respect to a horizontal direction by a given degree. In this case, since the radial road is supported by not only the upper surface but also the side surfaces, the radial stiffness becomes large.

Figure 16B:
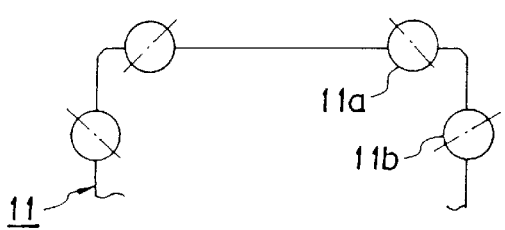

FIG. 16(b) shows another example, in which the contact angles in upper ball rows of the tracking base are arranged such that the contact angle lines are inclined with respect to horizontal direction by about 45 degrees and intersect to each other at an upper point of the upper ball rows; and the contact angles of grooves formed on the side surfaces are arranged such that the contact angle lines are inclined in a lower and inside direction with respect to the horizontal direction by a given degree.

Figure 16C:
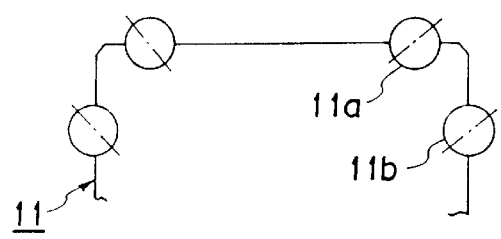

FIG. 16(c) depicts another example, in which the contact angles in upper ball rows of the tracking base are arranged such that the contact angle lines are inclined with respect to horizontal direction by about 45 degrees and intersect to each other at a lower point of the upper ball rows; and the contact angles in both the side grooves are also arranged such that the contact angle lines are inclined in a lower and inside direction with respect to the horizontal direction by a given degree.

In the examples shown in FIGS. 16(b) and (c), it is possible to support the load applied from lateral directions by the balls held in the grooves formed on the upper surfaces. Therefore, in these examples, the stiffness against the radial load and the load applied from the lateral directions is increased.

Figure 16D:
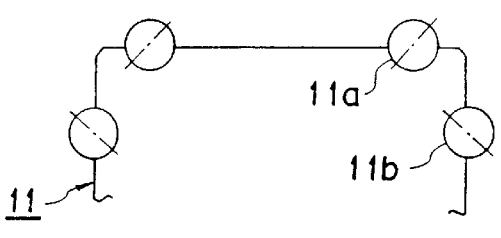

FIG. 16(d) represents an embodiment, in which the contact angles in the upper ball rows of the tracking base are constructed such that both the contact angle lines are inclined in the same direction with 45 degrees being parallel to each other; and the contact angles in the side ball rows are arranged such that the contact angle lines are inclined by 45 degrees in a reversed direction of the lines in the upper ball rows, being parallel to each other.

Figure 16E:
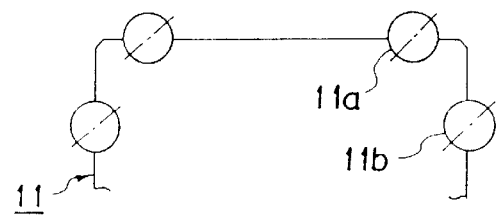

FIG. 16(e) illustrates another embodiment, in which the contact angles in the upper ball rows of the tracking base are constructed such that both the contact angle lines are inclined in the same direction by 45 degrees being parallel to each other; and the contact angles in the side ball rows are arranged such that both the contact angle lines are also inclined by 45 degrees in the same direction as the lines in the upper ball rows, being parallel to each other. In these embodiments shown in FIGS. 16(d) and (e), since the contact angle lines in the upper ball rows are inclined to be parallel to each other, it is possible to support the load applied from the right side direction in the figures. And thus, the stiffness against the load applied from the right side direction in the figures particularly becomes high.

Furthermore, it may be possible to provide an apparatus in which the contact angle lines extended in the horizontal direction and the contact angle lines extended in the inclined direction are combined. Therefore, a various type of linear movement guide apparatuses having different contact angle constructions, by which the stiffness is made high in the relevant direction in accordance with the portion to be used, can be provided.

(Six Rows Type)

FIGS. 17 to 21 show six rows type linear movement guide apparatuses in which a pair of two rows of ball rolling grooves are formed on each surface of the tracking base, i.e.

on the upper surface, each side surface of the tracking base. Therefore, six ball rows in total are formed in the apparatus.

FIGS. 17 to 21 represent linear movement guide apparatuses according to the ninth to twelfth embodiments of the present invention. The basic construction of such linear movement guide apparatuses having six rows of ball rolling grooves will be first explained with reference to FIGS. 7 and 8.

In these figures, the numerical reference 1 represents a linear movement guide apparatus as a whole, which comprises a tracking base 2 and a sliding base 3. The sliding base 3 is so designed to be linearly guided along the tracking base 2 and to have a concave portion 3d for accepting the tracking base 2. The apparatus comprises six ball rows, in which balls 4 are rotatable held in an endless manner, formed between the sliding base 3 and the tracking base 2.

The tracking base 2 has a square-shaped cross section and is extended in a longitudinal direction. On the upper surface of the tracking base 2, are provided a pair of two rows of ball rolling grooves 2a in a longitudinal direction; and a pair of two rows of ball rolling grooves 2b and 2c are extended on each side surface thereof.

The sliding base 3 comprises the concave portion 3d having a square-shaped cross section for accepting the tracking base 2. The tracking base 2 also has a square shaped cross section. On upper and side surfaces of the concave portion 3d, are provided corresponding ball rolling grooves 3a, 3b and 3c so as to face to the ball rolling grooves 2a, 2b and 2c, of the tracking base 2, respectively. It should be noted that the loads applied from the longitudinal and width directions are supported by these ball rolling grooves. The sliding base 3 is mounted on the tacking base 2 so as to traverse over the tracking base 2 by inserting the tracking base 2 into the concave portion 3d.

The sliding base 3 comprises a sliding base block 5 having a high stiffness, and side caps 6 fixed to each edge surface of the block 5. And, the above said ball rolling grooves 3a, 3b and 3c and ball relief bores 7 are formed on the concave portion 3d of the sliding base block 5. In the side caps 6, are provided direction converting paths, by which both ends of the ball paths in load areas between the ball rolling grooves 2a, 3a, 2b, 3b and 2c, 3c facing to each other and both ends of the ball relief bores 7 are connected to each other.

Between the ball rolling grooves 2a, 2b and 2c on the tracking base 2 and the corresponding ball rolling grooves 3a, 3b, 3c on the sliding base 3, which face to each other, a plurality of balls 4 are mounted in a rotatable manner. On the upper surface, are provided two ball rows 5; and on each side surface, are provided two ball rows 6 and 7, respectively. Therefore, six ball rows in total are provided in the apparatus.

Two ball rows 2b, 2c (or 3b, 3c) formed on both the side surfaces of either one of the tracking base 2 or the sliding base 3 are arranged such that the positional relationship between the center portions of the grooves are coincident with or deviated from the center portions of the corresponding ball rolling grooves 3b, 3c (or 2b, 2c) of either one of the tracking base or the sliding base 3 in upper and lower direction. Thus, the apparatus is constituted of the arbitrarily coupled tracking base 2 and sliding base 3, in which the above stated positional relationships of the center portions of the grooves is coincident with each other or deviated from each other.

By coupling the tracking base 2 or the sliding base 3, in which the corresponding positional relationship between the center portions of the grooves is coincident with or deviated from the corresponding tracking or sliding base in upper and lower directions, with the corresponding racking base 2 or the sliding base 3 in an arbitrary manner, as explained in the above, the contact angles of the balls 4 held in the ball rows 6 and 7 formed on the side surfaces can be adjusted. Thereby, the stiffness in upper and lower directions and right and left directions, which are required to support the loads applied from these directions, can be obtained, so that it is possible to provide a linear movement guide apparatus having a load supporting characteristic in accordance with the purpose of use thereof.

In order to adjust the above mentioned contact angles, it is preferred to design the ball rolling grooves as in the following.

That is to say, the ball rolling grooves 2a, 2b, 2c, 3a, 3b or 3c may be possible to have circular-ark type shapes or a Gothic-ark type shapes; however, it is desired to arrange such that at least each ball rolling groove 2b, 2c and 3b, 3c formed on side surfaces has its depth of about ½ of the diameter of balls 4 to be held therein. Thereby, the balls 4 held in the two ball rows 6 and 7, which are formed on the side surfaces, are made contact with any place of the two rows of ball rolling grooves 2b, 2c or 3b, 3c, which have almost semi circular shapes. And thus, it is possible to obtain almost all contact angles. It should be noted that in case that the variation of the contact angles is small, it may be possible to arrange the depths of the grooves about ¼ of the diameter of balls 4.

In the embodiments shown in FIGS. 17 to 21, the linear movement guide apparatuses are constructed such that the positional relationship between the center portions of the grooves are coincident with or deviated from those of the corresponding grooves; and each type of contact angle construction is obtained by combining the tracking base 2 or the sliding base 3 with the corresponding tacking base 2 or the corresponding sliding base 3 in an arbitrary manner.

Figure 17:
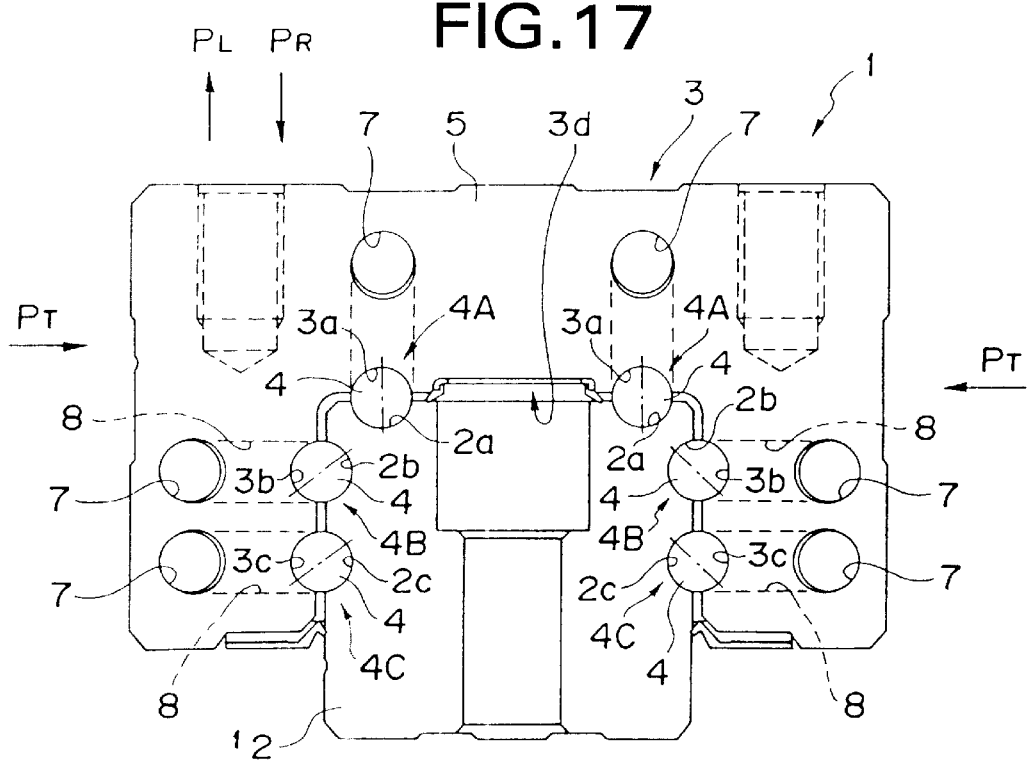
Figure 18:
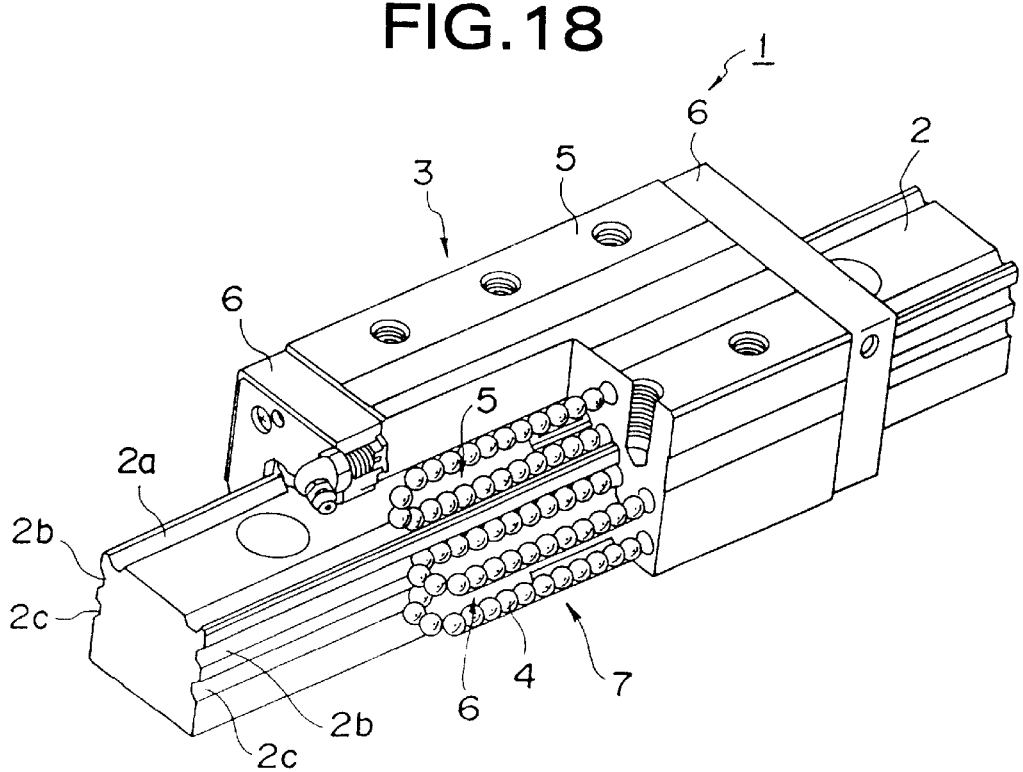

FIG. 17 is a schematic view showing the ninth embodiment according to the present invention. In the ninth embodiment, the centers OA of the ball rolling grooves 2b and 2c formed on side surfaces of the tracking base 2 are deviated from the centers OB of the corresponding ball rolling grooves 3b and 3c formed on the sliding base 3 in an upper direction, or the centers of OB of the ball rolling grooves 3b and 3c formed on side surfaces of the sliding base 3 are deviated from the centers OA of the corresponding ball rolling grooves 2b and 2c formed on the tracking base 2 in a lower direction; and thereby the contact angle lines of the balls 4 held in the ball rows 6 and 7 formed on the side surfaces are inclined by about 45 degrees in upper and inside direction of the tracking base 2 with respect to the horizontal direction. Such deviation can be obtained in the first to eighth embodiments by the same manner as in the above assembling method. In the ninth embodiment, the contact angles of balls 4 in the ball rows 5 formed on the upper surface, are arranged to be 90 degrees with respect to the horizontal direction.

In the ninth embodiment, the load applied from an upper direction against the sliding base 3 (radian load) PR is supported by the two ball rows 5 formed on the upper surface. And, the lateral load applied from left and right directions (horizontal direction load) PT is supported by either one of the two ball rows 6 and 7 formed on the side surfaces, according to the load applied direction. Further, the vertical load applied from the lower direction (reversed radial load) PL is supported by two ball rows 6 and 7 formed on the side surfaces.

Furthermore, the contact angles of the balls 4 in the two ball rows 6 and 7 formed on the side surfaces are arranged such that the contact angle lines are inclined in an upper and inside direction by 45 degrees with respect to the horizontal direction. Therefore, it is possible to support the load in a reversed radial direction and the load in a lateral direction in an even manner. Moreover, in such apparatus, the stiffness against the load applied from the lateral direction is much higher than that in the apparatus having only one ball row on each side surface.

Moreover, the load applied from the radial direction is supported by the two ball rows 5 formed on the upper surface, whose contact angles are about 90 degrees with respect to the horizontal direction. Therefore, a high stiffness can be obtained against the radial load.

Particularly, if the depths of the ball rolling grooves are set about 51% of the diameter of balls to be held therein, the contacting area of the balls against the general circular-ark type grooves becomes large (like a roller) and the supporting ability for the heavy load is rapidly improved, involving the construction of the contact angles, so that a high stiffness and a stable linear movement can be obtained.

That is to say, optimum and suitable combination of the tracking base and the sliding base can be obtained when the load are applied from a radial direction, a reversed direction and lateral (left and right) direction.

Figure 19:
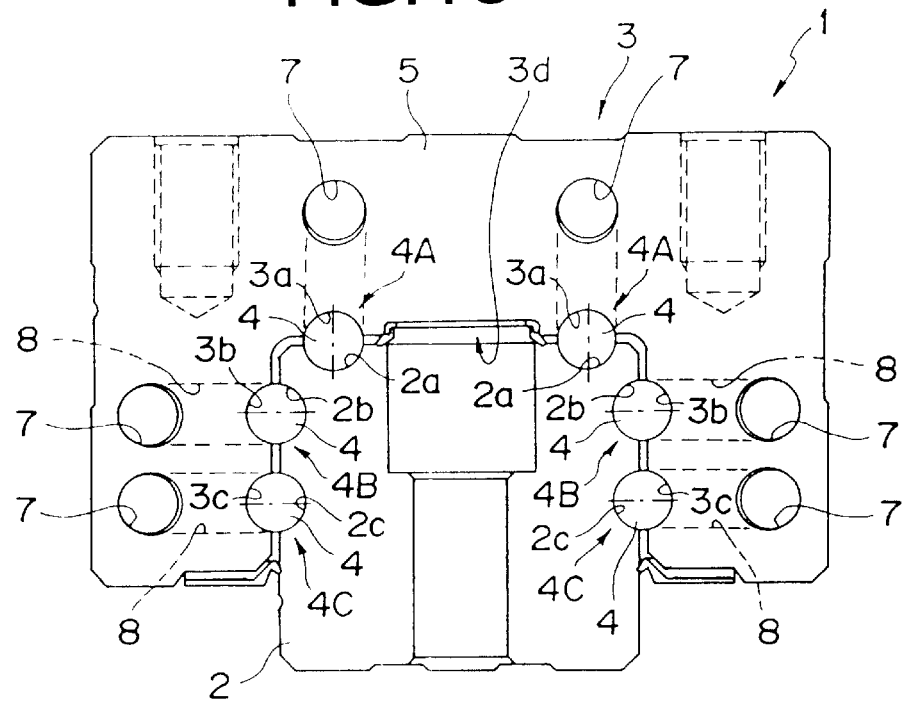

In FIG. 19, is illustrated the linear movement guide apparatus according to the tenth embodiment of the present invention. In the linear movement guide apparatus 1$a$, the positional relationship between the centers of the grooves is arranged to be coincident with the corresponding grooves, i.e. the relationship between either one of two rows of ball rolling grooves 2$b$ and 2$c$ (or 3$b$ and 3$c$) formed on side surfaces of the tracking base 2 or the sliding base 3 and the corresponding ball rolling grooves 3$b$ and 3$c$ (or 2$b$ and 2$c$) formed on the tracking or sliding base 2 or 3, so that the contact angles of balls 4 in the two ball rows 6 and 7 on the side surfaces become 0 degrees with respect to a horizontal direction. On the other hand, the contact angles of balls 4 in the two ball rows on the upper surface are arranged to be 90 degrees with respect to the horizontal direction.

In the tenth embodiment, the vertical load applied from the upper direction against the sliding base 3 (radial load) is supported by the two ball rows 5 formed on the upper surface. And the lateral load applied from left and right directions (horizontal direction load) is supported by two ball rows 6 and 7 formed on either of the side surfaces, according to the load applied direction.

Since the contact angles of balls 4 in the two ball rows on the side surfaces are arranged to be about 0 degrees with respect to the horizontal direction and the contact angles of balls 4 in the two ball rows 5 formed on the upper surface are arranged to be about 90 degrees with respect to the horizontal direction, a high stiffness can be obtained and it is possible to support the radial load and the lateral load in an even manner.

That is to say, the apparatus has a large stiffness against loads applied from not only the horizontal (left and right) direction but also the radial direction; and the combination of the tracking base and the sliding base is optimum in the case that the loads are applied from the radial direction and the horizontal (left and right) direction.

Figure 20:
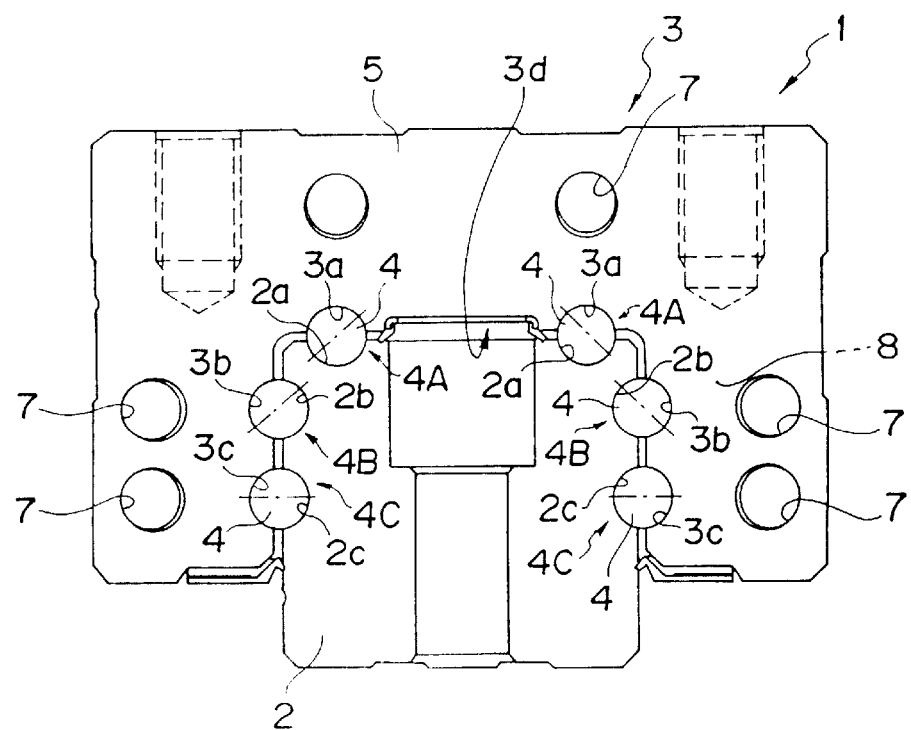

FIG. 20 is a schematic view showing a linear movement guide apparatus according to the eleventh embodiment of the present invention. In this embodiment, the contact angles of balls 4 in the upper ball rows 6 formed on the side surfaces are arranged to be about 45 degrees with respect to the horizontal direction and the contact angle lines in the upper ball rows intersect to each other at a point inside of the tracking base 2; but the contact angles of the balls 4 in the lower ball rows 7 formed on the side surfaces are arranged to be about 0 degrees with respect to the horizontal direction.

On the other hand, the contact angles of balls 4 in the two ball rows formed on the upper surface are 45 degrees with respect to the horizontal direction and the intersecting point of the contact angle lines therein locate outside of the tracking base 2.

Further, in FIG. 21, is depicted a linear movement guide apparatus according to the twelfth embodiment according to the present invention. In this linear movement guide apparatus 1$c$, the relationship of the contact angles of balls in the ball rows 6 and 7 formed on the side surfaces are arranged to be reversed to that of the apparatus according to the eleventh embodiment. That is to say, the contact angles of balls 4 in the lower ball rows 7 of the side surfaces are arranged to be about 45 degrees with respect to the horizontal surface and the contact lines thereof intersect to each other at a point inside of the tracking base 2; and the contact angles of the balls 4 in the upper ball rows 6 on the side surfaces are arranged to be about 0 degrees with respect to the horizontal direction.

Therefore, the combinations of the tracking base 2 and the sliding base 3 in the eleventh and twelfth embodiments are optimum for the case that a large load is applied from a reversed radial direction.

In FIGS. 22($a$) to ($c$), other examples of the constructions of contact angles of balls are shown. It should be noted that any other combination, which is not shown in these figures, are possible to be arranged.

In FIG. 22($d$), is provided another construction in which two ball rows are formed on one of the side surfaces but only one row is on the other side. In FIG. 22($e$), is provided still another construction in which two ball rows are formed on one of the side surfaces but only one is on the other side surface, in addition thereto, only one ball row is formed on the upper surface.

As stated in the above, it may be possible to combine the one ball row and two ball rows on the side surfaces, or to form only one ball row on each side surface and the upper surface. Furthermore, it may also be possible to arrange three ball rows or more on the side surfaces and the upper surface.

Further, in each embodiment explained in the above, no retainer for preventing that the balls 4 are fallen when the sliding base 3 is taken off from the tracking base 2 is provided. However, the present invention can be applied to the apparatus having such retainer.

Furthermore, in each embodiment, the tracking base has a square-shaped cross section and thus the concave portion formed in the sliding base also has a square-shaped cross section. However, the invention is not limited by the square-shaped bases.

According to the present invention, a necessary load supporting characteristic can be obtained in accordance with the amount and the direction of loads applied to the apparatus; and thus, it is possible to provide an apparatus having a large load supporting capacity in accordance with the purpose of use thereof.

INDUSTRIAL APPLICABILITY

In the linear movement guide apparatus according to the present invention, the contact angle in each ball rolling groove can be set arbitrarily by changing the distance between the two rows of ball rolling grooves formed on the upper surface of the tracking base and the distance between said ball rolling grooves and the ball rolling grooves formed on side surfaces of the tracking base, with respect to the distances between the corresponding ball rolling grooves formed on the sliding base. Therefore, it is possible to provide an apparatus having a suitable performance for the load applied thereto from each direction, by changing the pitches between the ball rolling grooves in accordance with the condition of load applied to the apparatus to form ball rolling grooves having the most optimum contact angles.

The cross sections of the ball rolling grooves may be possible to arrange as a single circular-ark shape or as a combination of two circular-arks, but the depth of the grooves should be set up so as to be able to select an arbitrary ball contact angles. It is preferred to set up the depth about ¼ to ½ of the balls to be held therein. In such construction, the balls held in the grooves surely made contact with any portion of the grooves, so that it is possible to obtain almost all contact angles, which have been required in the conventional linear movement guide apparatuses of this type.

According to the assembling method of the present invention, the common material can be used to manufacture the tracking base and the sliding base. And, a plurality types of linear movement guide apparatuses can be obtained only by changing the type of the dressers and pitches (distance) thereof, i.e. the pitches between the ball rolling grooves formed by the dressers, in accordance with the load condition. Then, the productivity of the apparatus is extremely improved.

What is claimed is:

1. A method of assembling a linear movement guide apparatus comprising the steps of:

forming a tracking base having substantially a square cross section and formed, at an upper surface thereof, with a pair of arcuate first ball rolling grooves separated from each other by a first pitch in a width direction thereof and each having a depth approximately half of a diameter of a ball as a rolling member and formed, at each of bilateral side surfaces thereof, with a pair of arcuate second ball rolling grooves separated from each other by a second pitch in a height direction thereof;

forming a plurality kinds of sliding bases formed with recessed portions in which said tracking base is mounted to be slidable with respect to the tracking base through six rows of rolling balls and provided with a pair of third ball rolling grooves separated from each other by a third pitch different from the first pitch in a width direction thereof and a pair of fourth ball rolling grooves separated from each other by a fourth pitch with respect to the third ball rolling grooves different from the second pitch in a height direction thereof; and assembling a linear movement guide apparatus, by selecting a combination of said first and third pitches and a combination of said second and fourth pitches, having one of following first to fourth contact angle structures: first contact angle structure in which a contact angle of a ball disposed between said first and third ball rolling grooves is 90° with respect to a horizontal line and a contact angle of a ball disposed between said second and fourth ball rolling grooves is 45° in an upward oblique direction towards the tracking base with respect to the horizontal line; second contact angle structure in which a contact angle of a ball disposed between said first and third ball rolling grooves is 90° with respect to a horizontal line and a contact angle of a ball disposed between said second and fourth ball rolling grooves is 0°; third contact angle structure in which a contact angle of a ball disposed between said first and third ball rolling grooves is 45° in a downward oblique direction towards a central portion with respect to a horizontal line and a contact angle of a ball disposed between said second and fourth ball rolling grooves is 45° in an upward oblique direction towards the tracking base with respect to the horizontal line; and fourth contact angle structure in which a contact angle of a ball disposed between said first and third ball rolling grooves is 45° in an upward oblique direction towards a central portion with respect to a horizontal line and a contact angle of a ball disposed between said second and fourth ball rolling grooves is 45° in an upward oblique direction towards the tracking base with respect to the horizontal line.

2. A method of assembling a linear movement guide apparatus according to claim 1, wherein said first to fourth ball rolling grooves each has a depth approximately corresponding to ¼ to ½ of the diameter of the ball.

3. A method of assembling a linear movement guide apparatus comprising the steps of:

forming a tracking base having substantially a square cross section and formed, at an upper surface thereof, with a pair of bilateral two arcuate first ball rolling grooves separated from each other by a predetermined pitch in a width direction thereof and each having a depth approximately half of a diameter of a ball as a rolling member and formed, at each of bilateral side surfaces thereof, with a pair of two arcuate second ball rolling grooves separated from each other by a predetermined pitch in a height direction thereof;

forming a plurality kinds of sliding bases formed with recessed portions in which said tracking base is mounted to be slidable with respect to the tracking base through six rows of rolling balls and provided with arcuate third ball rolling grooves composed of a pair of bilateral two ball rolling grooves in a manner of being disposed at an upper bottom surface of the recessed portions in the same manner as that for the first ball rolling grooves in the width direction or in a shifted manner with respect thereto and arcuate fourth ball rolling grooves composed of a pair of vertical two ball rolling grooves in a manner of being disposed at both inside surfaces of the recessed portions in the same manner as that for the second ball rolling grooves formed to both side surfaces of the tracking base or in a shifted manner with respect thereto; and assembling a linear movement guide apparatus, by selecting a combination of phases of said first and third ball rolling grooves and a combination of phases of said second and fourth ball rolling grooves, having one of following first to fourth contact angle structures: first contact angle structure in which a contact angle of a ball disposed between said first and third ball rolling grooves is 90° with respect to a horizontal line and a contact angle of a ball disposed between said second and fourth ball rolling grooves is 45° in an upward oblique direction towards the tracking base with respect to the horizontal line; second contact angle structure in which a contact angle of a ball disposed between said first and third ball rolling grooves is 90° with respect to a horizontal line and a contact angle of a ball disposed between said second and fourth ball rolling grooves is 0°; third contact angle structure in which a contact angle of two ball rows disposed between said first and third ball rolling grooves is 45° in an upward oblique direction towards a central portion with respect to a horizontal line, a contact angle of upper two ball rows disposed between said second and fourth ball rolling grooves is 45° in an upward oblique direction towards the tracking base with respect to the horizontal line, and a contact angle of lower two ball rows disposed therebetween is 0° with respect to the horizontal line; and fourth contact angle structure in which a contact angle of two ball rows disposed between said first and third ball rolling grooves is 45° in an upward oblique direction towards a central portion with respect to a horizontal line, a contact angle of upper two ball rows disposed between said second and fourth ball rolling grooves is 0° with respect to the horizontal line and a contact angle of lower two ball rows disposed therebetween is 45° in an upward oblique direction towards the tracking base with respect to the horizontal line.

* * * * *